(12) United States Patent
Hinson

(10) Patent No.: US 11,621,663 B2
(45) Date of Patent: Apr. 4, 2023

(54) SOLAR TRACKER SYSTEM AND METHOD FOR CONTROLLING AMOUNT OF SUNLIGHT AND MAXIMIZING SOLAR ENERGY IN A GREENHOUSE

(71) Applicant: TSO Greenhouses, LLC, Phoenix, AZ (US)

(72) Inventor: David Fredrick Hinson, Phoenix, AZ (US)

(73) Assignee: TSO GREENHOUSES, LLC, Phoenix, AZ (US)

( * ) Notice: Subject to any disclaimer, the term of this patent is extended or adjusted under 35 U.S.C. 154(b) by 211 days.

(21) Appl. No.: 17/027,651

(22) Filed: Sep. 21, 2020

(65) Prior Publication Data

US 2021/0006201 A1 Jan. 7, 2021

Related U.S. Application Data

(63) Continuation-in-part of application No. PCT/IB2019/052242, filed on Mar. 19, 2019.

(60) Provisional application No. 62/644,867, filed on Mar. 19, 2018.

(51) Int. Cl.
| | |
|---|---|
| *H02S 20/32* | (2014.01) |
| *A01G 9/24* | (2006.01) |
| *G01S 3/786* | (2006.01) |
| *F24S 30/00* | (2018.01) |
| *E06B 9/24* | (2006.01) |

(52) U.S. Cl.
CPC .............. *H02S 20/32* (2014.12); *A01G 9/243* (2013.01); *G01S 3/7861* (2013.01); *E06B 2009/2476* (2013.01); *F24S 2030/134* (2018.05); *F24S 2030/136* (2018.05); *Y02E 10/50* (2013.01)

(58) Field of Classification Search
CPC .............................................. E06B 2009/2476
See application file for complete search history.

(56) References Cited

U.S. PATENT DOCUMENTS

| | | | |
|---|---|---|---|
| 9,509,247 B1 | 11/2016 | Humel | |
| 2002/0179138 A1 | 12/2002 | Lawheed | |
| 2006/0151022 A1 | 7/2006 | Lawheed | |
| 2009/0139565 A1* | 6/2009 | Jeronimo Lopes | ..... F24S 10/75 136/251 |
| 2011/0005128 A1 | 1/2011 | Chuang et al. | |
| 2011/0048845 A1* | 3/2011 | Park | .......... H02S 20/21 181/210 |

(Continued)

FOREIGN PATENT DOCUMENTS

| | | | | |
|---|---|---|---|---|
| CN | 1873157 A | * | 12/2006 | |
| EP | 3869119 A1 | * | 8/2021 | ............. F24S 20/00 |
| KR | 101000293 B1 | | 12/2010 | |

*Primary Examiner* — Ryan S Cannon

(57) ABSTRACT

A solar tracker system is a system and method to integrate the solar cells to a greenhouse. The solar tracker system comprises solar tracker modules that include solar cells, racks, gears, pinons, motors, and mounting brackets to efficiently and conveniently be installed to the roofs and walls of a new greenhouse and/or an existing greenhouse for retrofit application. Additionally, the solar tracker system uses various sensors to provide real-time conditions to the greenhouse. The method uses actual or system default values to adjust the angle and position of solar cells according to various environmental factors, such as DLI, weather, date, time, direction of sunlight, or type of plant.

3 Claims, 27 Drawing Sheets

(56) References Cited

U.S. PATENT DOCUMENTS

| | | | |
|---|---|---|---|
| 2011/0094503 A1 | 4/2011 | Jones et al. | |
| 2011/0240094 A1* | 10/2011 | Hoffman | E06B 9/24 |
| | | | 136/246 |
| 2012/0158362 A1 | 6/2012 | Vandevelde et al. | |
| 2013/0200017 A1* | 8/2013 | Chen | A01G 9/243 |
| | | | 211/41.1 |
| 2015/0092400 A1* | 4/2015 | Vincenzi | F21V 7/06 |
| | | | 362/183 |

\* cited by examiner

SOLAR TRACKER SYSTEM AND METHOD FOR CONTROLLING AMOUNT OF SUNLIGHT AND MAXIMIZING SOLAR ENERGY IN A GREENHOUSE

FIELD OF THE INVENTION

The present invention generally relates to solar panel tracker systems. More specifically, the present invention comprises a solar tracker system and a method that can regulate the solar cells to provide controlled amount of sunlight and shading to a greenhouse. The greenhouse can take advantage of the electricity generated by the solar cells and adjust the amount of sunlight and/or shading for the optimal operation and efficiency in the greenhouse.

BACKGROUND OF THE INVENTION

Without light, plants do not grow. The energy provided by natural sunlight, measured in DLI (Daily Light Integral in mol per square meter per day), is the most critical contributing factor in the growth of plants. However, natural sunlight is the most poorly managed element of a controlled growing environment in today's greenhouses.

Currently, the existing methods of controlling sunlight involving different practices of manually shading at different times of the growth cycle include manual shade cloth, whitewash and paint, and soaping the glass of the greenhouse. These shading practices all require expensive and potentially dangerous labor conditions. Additionally, the professional management of these shading practices requires a manager making constant decisions with very little, if any, scientific data. Further, due to the flawed architectural designs of most existing greenhouses, the sunlight control has historically been underutilized. Therefore, how to operate an efficient greenhouse to provide an optimal environment for desired plants is an issue for every greenhouse owner. In the meantime, solar energy is infinite and abundant. As a non-renewable energy, such as petroleum, will eventually be depleted by human, inventors and researchers are all trying to explore solar energy as efficient as possible. However, since both solar cells and plants absorb sunlight, how to balance the energy consumption between them creates a challenge when the user tries to integrate solar cells to the greenhouse.

It is an object of the present invention to provide a solution to the afore-mentioned problems and drawbacks. The present invention provides an apparatus, system, and method to properly integrate the solar cells to the greenhouse. The solar tracker system of the present invention comprises a plurality of solar tracker modules that include a plurality of solar cells, racks, gears, pinons, motors, and mounting brackets to efficiently and conveniently install the solar tracker system to the roof and/or walls of the greenhouse. The solar tracker system is designed with significant flexibility so that the present invention can be integrated into a new greenhouse and conveniently installed onto an existing greenhouse for retrofit application. Additionally, the solar tracker system uses various sensors to provide real-time conditions to a control system that controls and monitors each of the plurality of solar tracker modules installed on the greenhouse. The method for the control system of the present invention uses default values stored in the system databases and/or exterior databases, to adjust the angle and position of each of the plurality of solar cells according to various environmental factors, such as DLI, weather, date, time, direction of sunlight, or type of plant. The user can choose to manually enter those values with the control system to adjust the angle and position of the solar cells, or the user can manually enter the amount of desired shade and let the control system to adjust the angle and position of the solar cells accordingly. Not only the solar cells are controlled by the system and method of the present invention to reduce the energy consumption of the greenhouse, the solar cells on each of the plurality of solar tracker modules generate maximum amount of electric energy used for the greenhouse with capabilities of expanding energy usage to other onsite facilities. Thus, the present invention precisely provides the maximum efficiency of converting solar energy into electric energy, optimum amount of sunlight/shade for highest crop yields, as well as, the greatest quality, complete automation of shading, appropriate feedback sensors, and the technology to control all user-desired greenhouse conditions optimal for the growth of various plants.

SUMMARY OF THE INVENTION

The present invention offers an apparatus and system of solar tracker modules to any greenhouse. For new greenhouses, these modules can act as the glazing, or on existing greenhouses, can replace, or be mounted outside the existing glazing. A user can then adjust the angle and position of the solar panel to regulate the amount of sunlight to be absorbed by the plant or the solar modules. The user can also adjust the solar cells according to different zones and the types of plant growing in the greenhouse.

The present invention provides a system and method to integrate the solar cells to the greenhouse. The solar tracker system of the present invention comprises a plurality of solar tracker modules that includes a plurality of solar cells, racks, gears, pinons, motors, and mounting brackets to efficiently and conveniently install the solar tracker system to the roofs and/or walls of the greenhouse. The solar tracker system is designed with significant flexibility so that the present invention can be integrated into a new greenhouse and conveniently installed onto an existing greenhouse for retrofit application. Additionally, the solar tracker system uses various sensors to provide real-time conditions to a control system that controls and monitors each of the plurality of solar tracker modules installed on the greenhouse. The method for the control system of the present invention uses default values stored in the system databases and/or exterior databases, to adjust the angle and position of each of the plurality of solar cells according to various environmental factors, such as DLI, weather, date, time, direction of sunlight, or type of plant. Additionally, the control algorithm of the method calculates the angle of each of the plurality of solar cells based on expert data and/or the correlation between the angle and the resulting shade percentage on the corresponding floor area of the greenhouse. The user can choose to manually enter those values with the control system to adjust the angle and position of the solar cells, or the user can manually enter the amount of desired shade and let the control system to adjust the angle and position of the solar cells accordingly. Not only the solar cells are controlled by the system and method of the present invention to reduce the energy consumption of the greenhouse, the solar cells on each of the plurality of solar tracker modules generate maximum amount of electric energy used for the greenhouse with capabilities of expanding energy usage to other onsite facilities. Thus, the present invention precisely provides the maximum efficiency of converting solar energy into electric energy, optimum amount of sunlight/shade for highest crop yields, as well as, the greatest quality, complete automation of shading, appropriate feedback sensors, and the technology to control all user-desired greenhouse conditions optimal for the growth of various plants.

BRIEF DESCRIPTION OF THE DRAWINGS

FIG. 3 is a left side view of the alternative embodiment of the solar tracker module without the exterior frame indicating the closeup view of section D of the present invention.

DETAIL DESCRIPTIONS OF THE INVENTION

Figure 1:
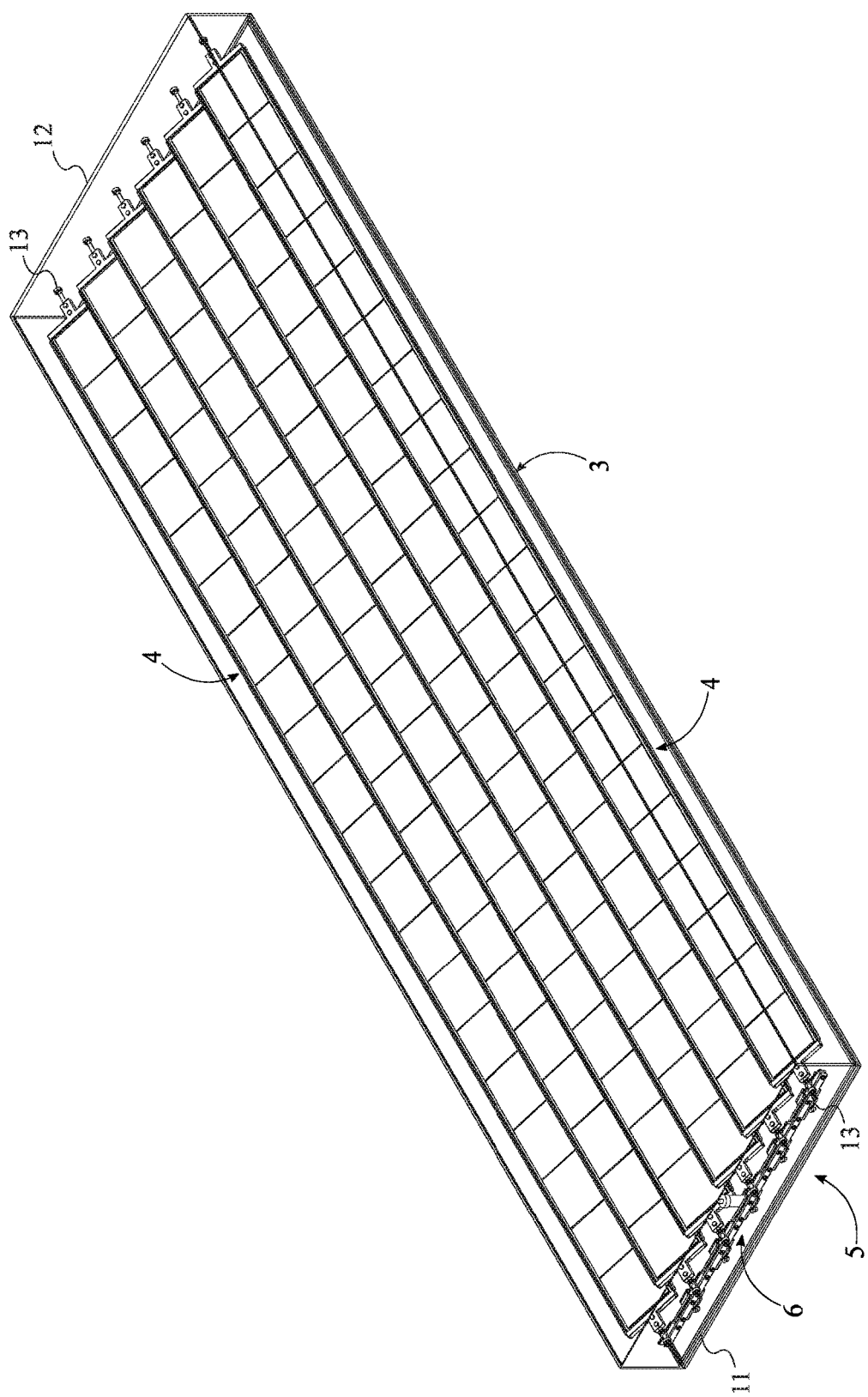
FIG. 1 is an isometric perspective view of the preferred embodiment of the solar tracker module of the present invention.
Figure 2:
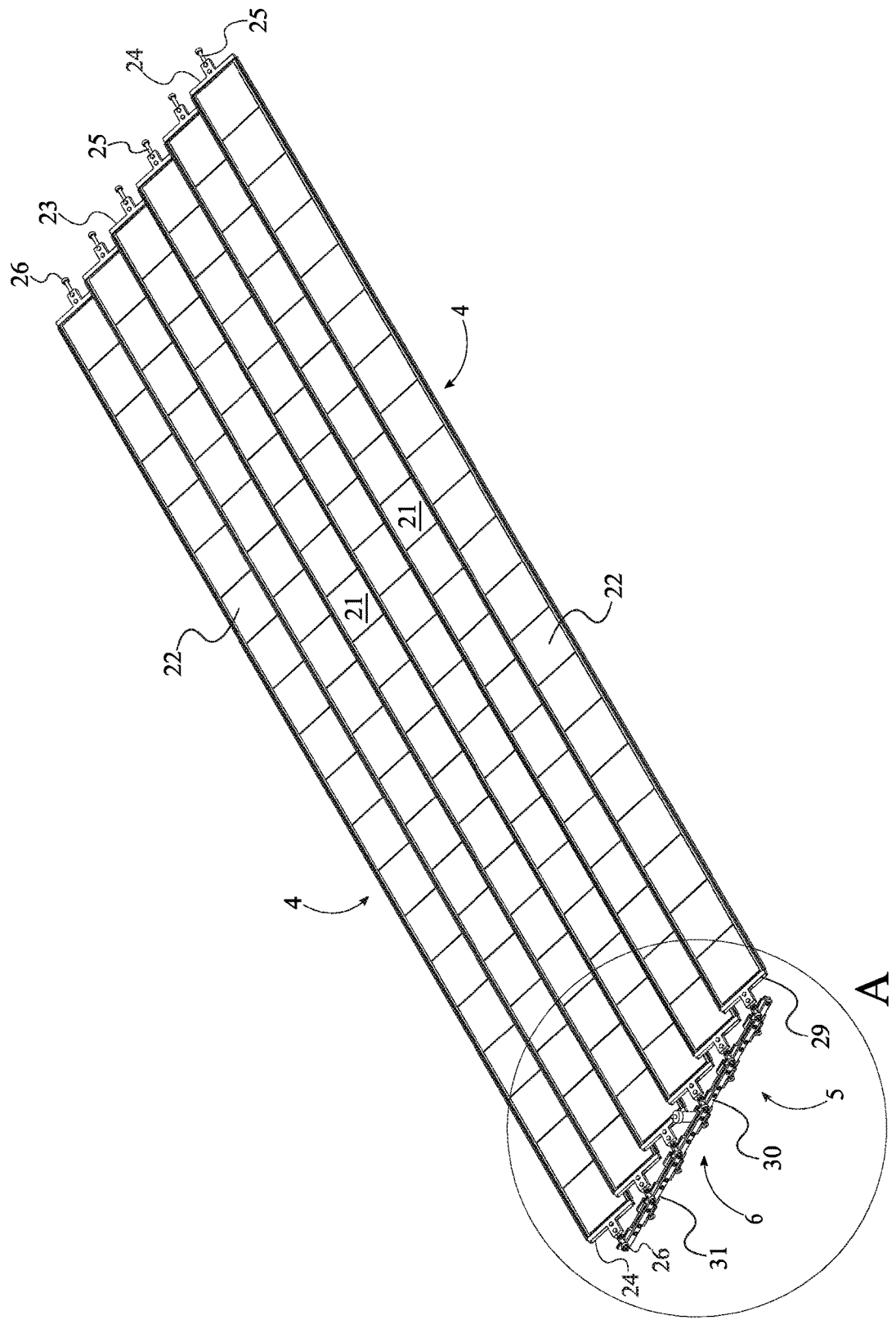
FIG. 2 is an isometric perspective view of the preferred embodiment of the solar tracker module without the exterior frame indicating the closeup view of section A.
Figure 3:
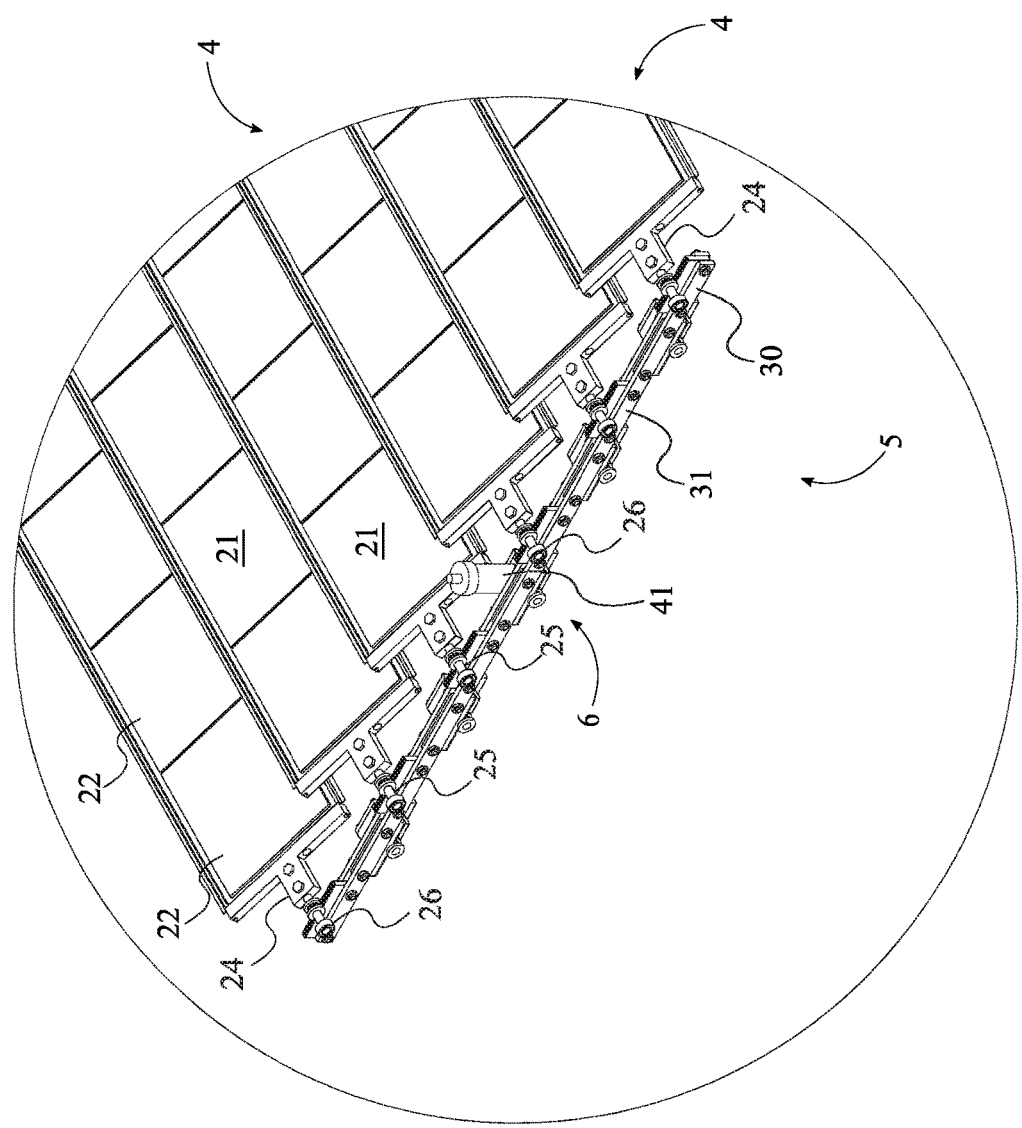
FIG. 3 is a closeup view of section A of the preferred embodiment of the solar tracker module without the exterior frame of the present invention.
Figure 4:
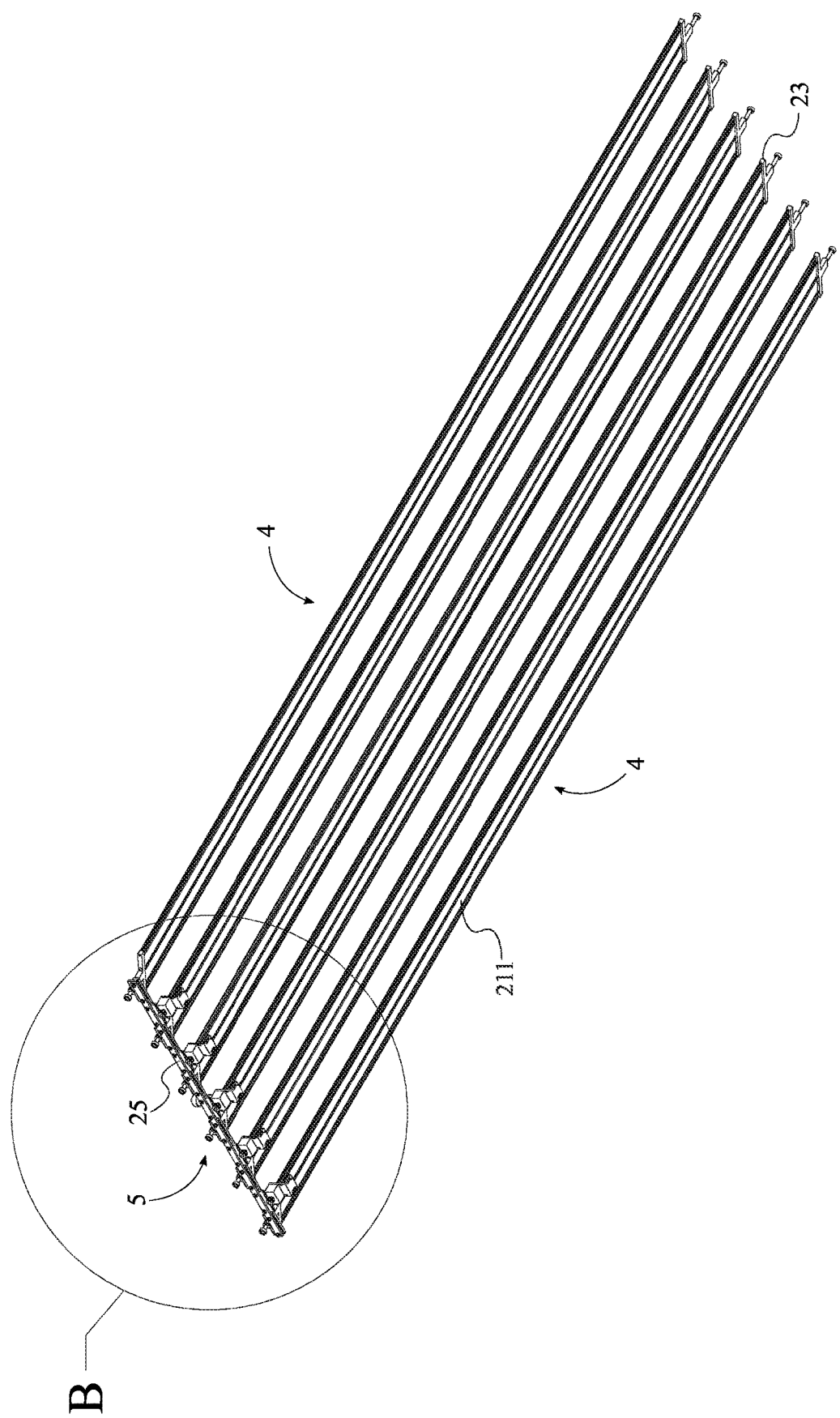
FIG. 4 is a bottom view of the preferred embodiment of the solar tracker module without the exterior frame indicating the closeup view of section B of the present invention.
Figure 5:
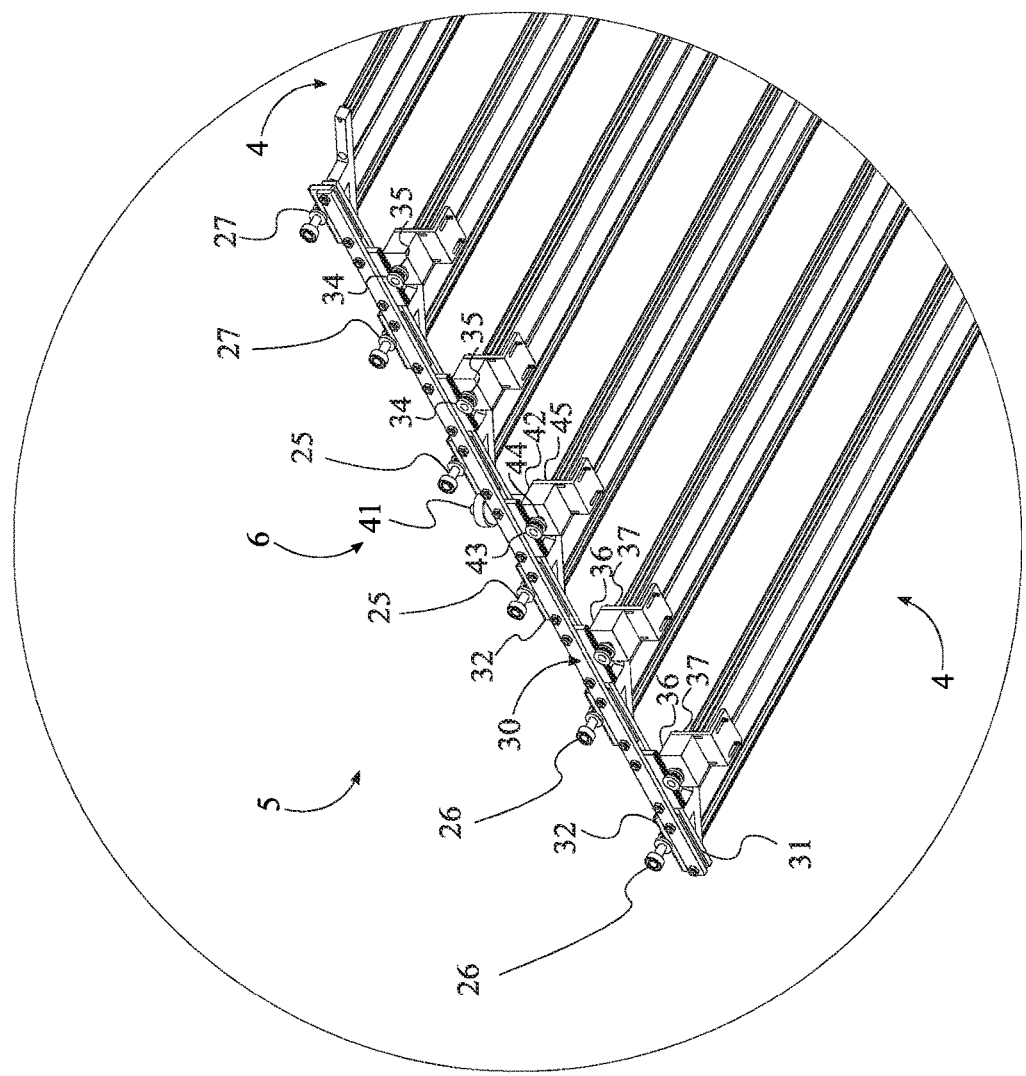
FIG. 5 is a closeup view of section B of the preferred embodiment of the solar tracker module without the exterior frame of the present invention.
Figure 6:
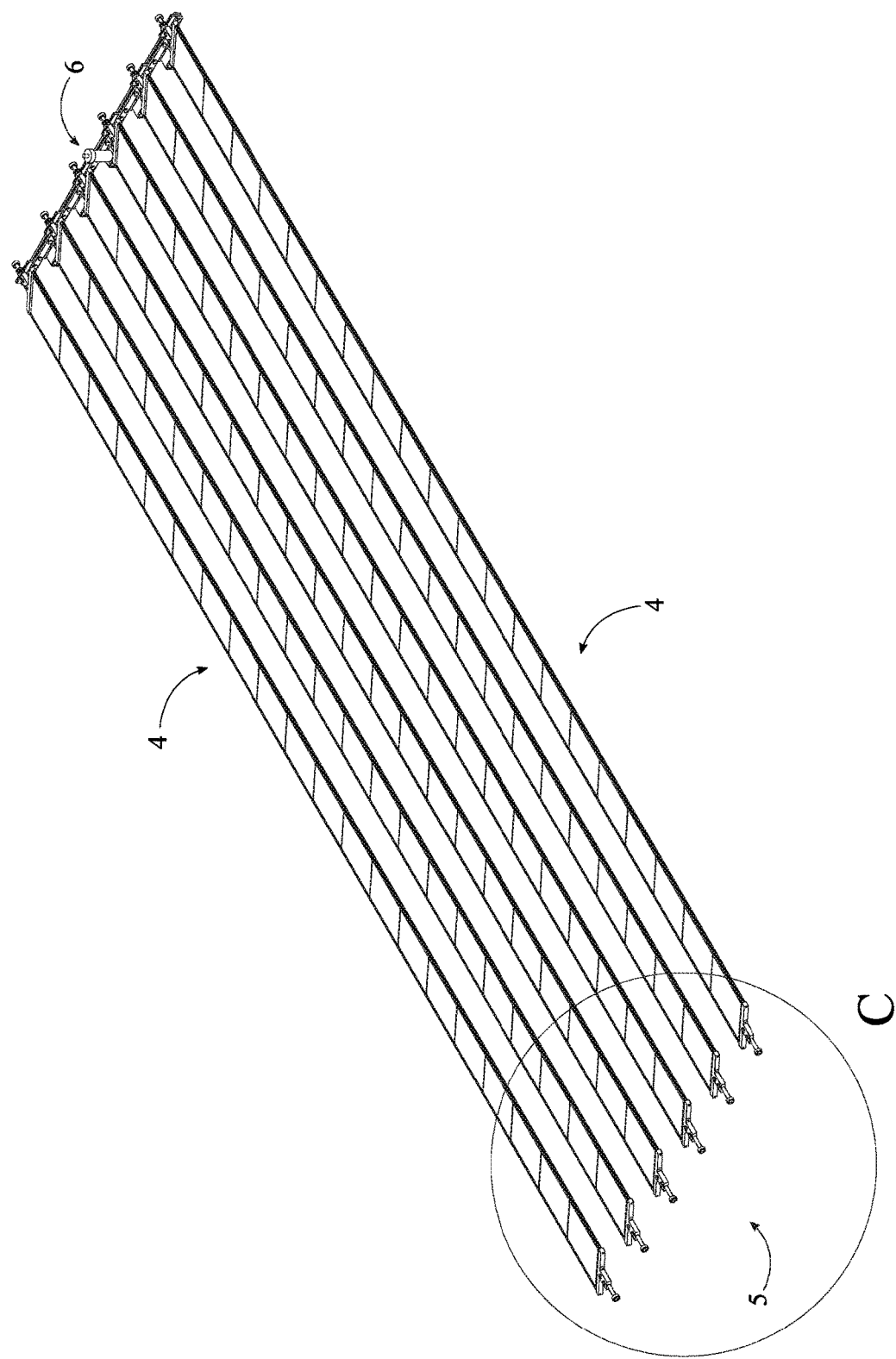
FIG. 6 is a right side view of the preferred embodiment of the solar tracker module without the exterior frame indicating the closeup view of section C of the present invention.
Figure 7:
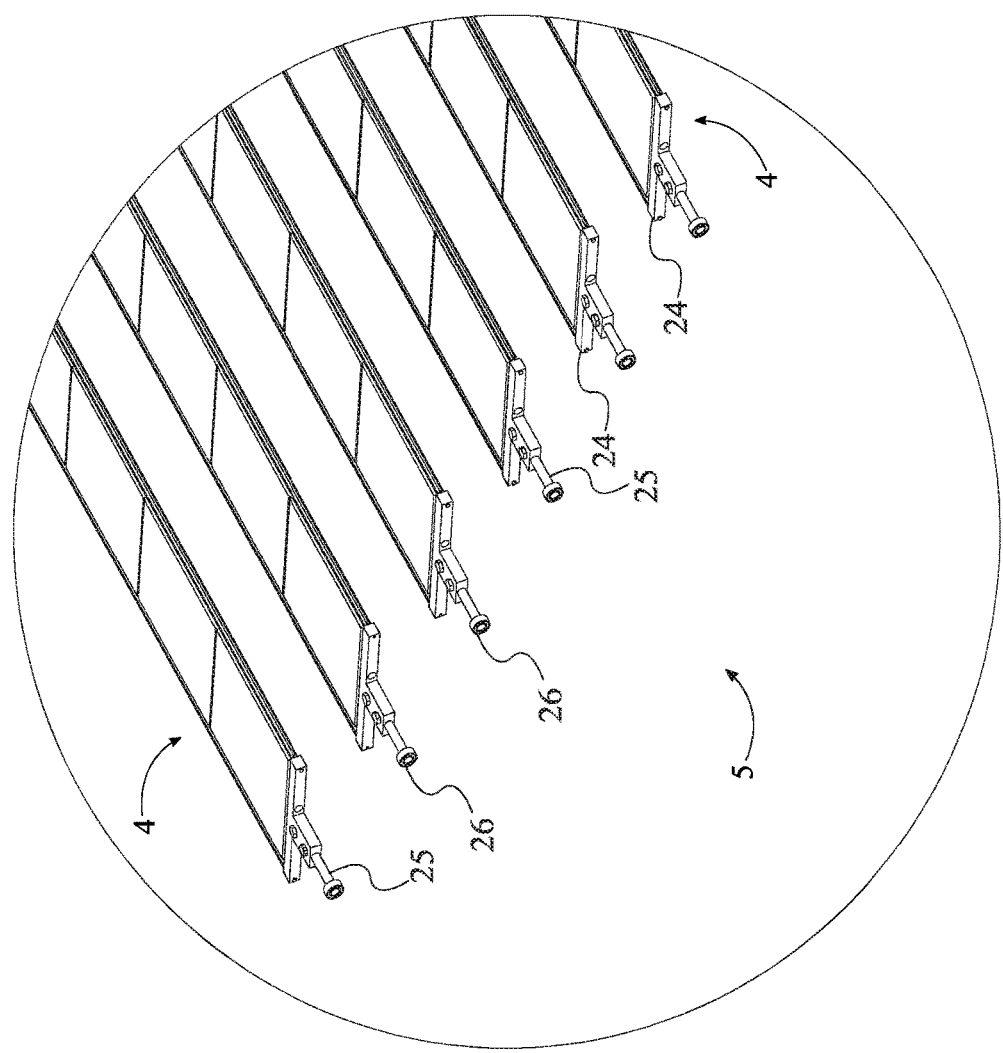
FIG. 7 is a closeup view of section C of the preferred embodiment of the solar tracker module without the exterior frame of the present invention.

All illustrations of the drawings are for the purpose of describing selected versions of the present invention and are not intended to limit the scope of the present invention.

As can be seen in FIG. 1 to FIG. 27, the present invention comprises an apparatus, a system, and a method for a solar tracker that can be installed on any greenhouse. The solar tracker apparatus and system can act as the glazing when installed on new greenhouses and/or can be blended into the exterior glazing of existing greenhouses. The solar tracker system of the present invention comprises a plurality of solar tracker modules that includes a plurality of solar cells, racks, gears, pinons, motors, and mounting brackets to efficiently and conveniently install the solar tracker system to the roofs and/or walls of the greenhouse. The solar tracker system is designed with significant flexibility so that the present invention can be integrated into a new greenhouse and conveniently installed onto an existing greenhouse for retrofit application.

In a manual control mode provided by the method of the present invention, a user can adjust the angle and position of the solar cells of the solar tracker apparatus and system to regulate the amount of sunlight to be absorbed by the plants inside the greenhouse or the solar cells. The user can also adjust the solar cells according to different zone and the type of plant growing in a specific zone of the greenhouse. However, in the preferred embodiment, the present invention provides a system and method to automatically control the angle and position of the solar cells to provide the optimal sunlight and/or shading that the plants needed to grow. Additionally, the solar tracker system uses various sensors to provide real-time conditions to a control system of the method that controls and monitors each of the plurality of solar tracker modules installed on the greenhouse. The method for the control system of the present invention uses default values stored in the system databases and/or exterior databases, to adjust the angle and position of the plurality of solar cells according to various environmental factors, such as DLI (Day Light Integral), weather, date, time, direction of sunlight, or type of plant. Additionally, the control algorithm of the method calculates the angle of each of the plurality of solar cells based on expert data and/or the correlation between the angle and the resulting shade percentage on the corresponding floor area of the greenhouse. The user can choose to manually enter those values with the control system to adjust the angle and position of the solar cells, or the user can manually enter the amount of desired shade and let the control system of the method to adjust the angle and position of the solar cells accordingly. Not only the solar cells are controlled by the system and method of the present invention to reduce the energy consumption of the greenhouse, but also the solar cells on each of the plurality of solar tracker modules generate maximum amount of electric energy used for the greenhouse with capabilities of expanding energy usage to other onsite facilities. Thus, the present invention precisely provides the maximum efficiency of converting solar energy into electric energy, optimum amount of sunlight/shade for highest crop yields, as well as, the greatest quality, complete automation of shading, appropriate feedback sensors, and the technology to control all user-desired greenhouse conditions optimal for the growth of various plants.

As can be seen in FIG. 1 to FIG. 2, FIG. 9 to FIG. 10, and FIG. 18 to FIG. 20, the solar tracker system of the present invention comprises a plurality of solar tracker modules 1 and a plurality of mounting brackets 2. The plurality of mounting brackets 2 is used to mount the plurality of solar tracker modules 1 onto the exterior structural elements of the greenhouse including, but not limited to, roofs, walls, etc. The plurality of mounting brackets 2 can be, but is not limited to, circular shape, L-shape, etc. Further, the plurality of mounting brackets 2 can be made of materials including, but not limited to, stainless steel, galvanized steel, or any other suitable material.

As can be seen in FIG. 1 to FIG. 8, in the preferred embodiment of the present invention, each of the plurality of solar tracker modules 1 comprises an open frame 3, a plurality of solar blades 4, a rack assembly 5, and a motor drive 6. More specifically, the open frame provides a housing for the solar tracker module 1, while the rack assembly 5 driven by the motor drive 6 rotates each of the plurality of solar blades 4 to provide sun-tracking and shading of the greenhouse interior.

Figure 8:
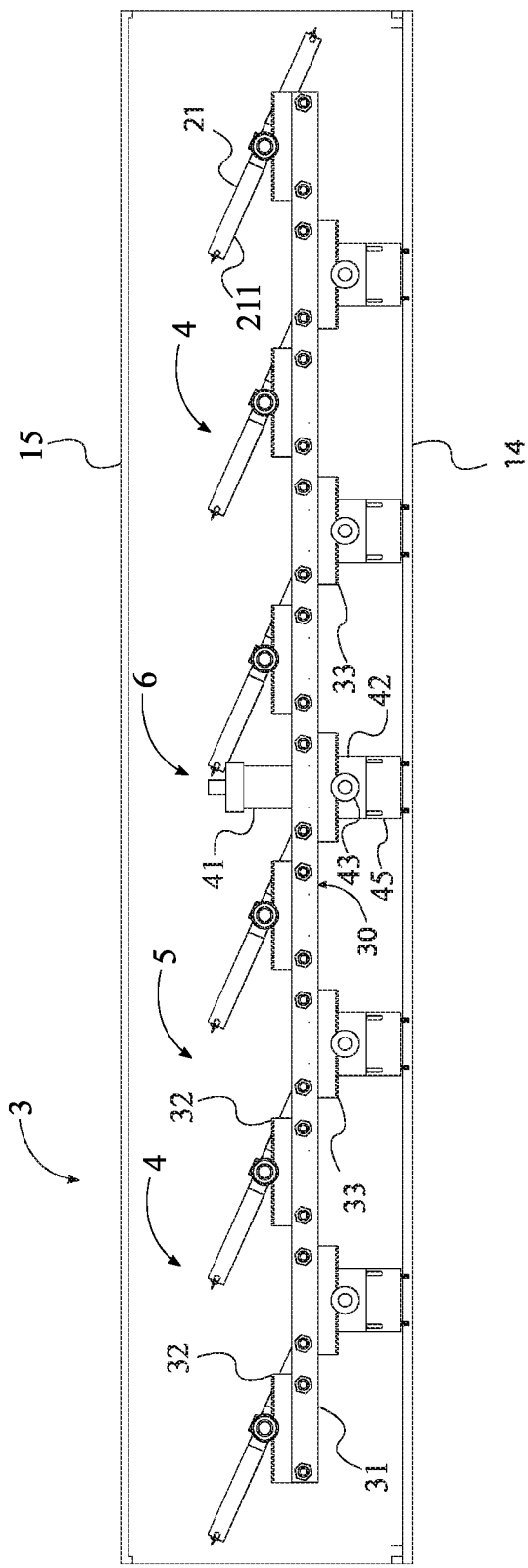
FIG. 8 is a right side view of the preferred embodiment of the solar tracker module of the present invention.

As can be seen in FIG. 1 and FIG. 8, the open frame 3 of the solar tracker module 1 comprises a first end wall 11, a second end wall 12, a plurality of holes 13, a back support 14, and a lid 15. Specifically, the back support 14 functions as the base support for the solar tracker module 1 with the first end wall 11 and the second end wall 12 being terminally connected to the back support 14. Additionally, the back support 14 includes, but is not limited to, a transparent rigid plastic material such as polycarbonate, etc. Further, the exterior surface of the back support 14 can include a diffuse surface and the diffusive surface characteristic provides uniform light reflection to the interior of the greenhouse when the plurality of solar blades 4 is closed for complete shading. The lid 15 is terminally connected to the first end wall 11 and the second end wall 12 as seen in FIG. 8. The lid 15 is used to provide a cover to the solar tracker module 1 and can be made detachable to provide convenient access to the inside of the solar tracker module 1. Additionally, the lid 15 can include, but is not limited to, a transparent rigid material such plastic, glass, glazing, etc. Further, the open frame 3 is made of a material including, but not limited to, transparent and rigid plastic, composite, and any other suitable material. The plurality of holes 13 are distributed across each of the first end wall 11 and the second end wall 12. Each of the plurality of holes 13 provides longitudinal support to each of the plurality of solar blades 4. The first end wall 11 is terminally positioned on the back support 14 and the second end wall 12 is terminally positioned on the back support 14, opposite the first end wall 11. Additionally, each of the plurality of solar blades 4 of the solar tracker module 1 comprises a sun-facing surface 21, a plurality of solar cells 22, a first end 29, a second end 23. More specifically, the sun-facing surface 21 is the longitudinal surface of the solar blade 4, and the plurality of solar cells 22 is mounted on and distributed across the sun-facing surface 21. In other embodiments of the present invention, the plurality of solar cells 22 can be mounted on and distributed across both the sun-facing surface 21 and/or the second surface 211 of each of the plurality solar blades 4. Each of the plurality of solar cells 22 can include, but is not limited to, low density solar cell, high density solar cell, and any other suitable solar cell. Further, the first end 29 is distally positioned on one of the plurality of solar blades 4. Additionally, the first end 29 is rotationally mounted to the first end wall 11 of the open frame 3 and is the lateral side of the solar blade 4, adjacent the first end wall 11 of the open frame 3 as seen in FIG. 1. The second end 23 is distally positioned on one of the plurality of solar blades 4, opposite the first end 29 and is rotationally mounted to the second end wall 12 of the open frame 3. Additionally, the second end 23 is the lateral side of the solar blade 4, positioned opposite the first end 29 and adjacent the second end wall 12 of the open frame 3. The rack assembly 5 is mounted to each of the plurality of solar blades 4, adjacent the second end 23. The motor drive 6 comprises a motor 41. The motor 41 is mounted to the back support 14 of the open frame 3, adjacent the send end wall 12, and the motor 41 is connected to rack assembly 5.

As can be seen in FIG. 2 to FIG. 7, the rack assembly 5 comprises a gear rack assembly 30. Additionally, each of the plurality of solar blades 4 of the solar tracker module 1 comprises a sun-facing surface 21, a plurality of solar cells 22, a first end 29, a second end 23, a plurality of T-brackets 24, a plurality of first shafts 25, a plurality of end bearings 26, a plurality of first pinions 27, and a second surface 211. More specifically, the sun-facing surface 21 is the longitudinal surface of the solar blade 4, and the plurality of solar cells 22 is mounted on and distributed across the sun-facing surface 21. In other embodiments of the present invention, the plurality of solar cells 22 can be mounted on and distributed across both the sun-facing surface 21 and/or the second surface 211 of each of the plurality solar blades 4. Additionally, each of the plurality of solar cells 22 can include, but is not limited to, low density solar cell, high density solar cell, and any other suitable solar cell. The first end 29 is the lateral side of the solar blade 4, adjacent the first end wall 11 of the open frame 3 as seen in FIG. 1. The second end 23 is the lateral side of the solar blade 4, positioned opposite the first end 29 and adjacent the second end wall 12 of the open frame 3. Each of the plurality of T-brackets 24 is terminally mounted to each of the first end 29 and the second end 23 of the solar blade 4. One of the plurality of the first shafts 25 is terminally and centrally connected to each of the plurality of T-brackets 24. Additionally, each of the plurality of end bearings 26 is terminally and concentrically connected to each of the plurality of first shafts 25, opposite to the T-bracket 24. Further, each of the plurality of end bearings 26 is mounted to one of the plurality of holes 13 of each of the first end wall 11 and second end wall 12 of the open frame 3, thus providing the longitudinal support to each of the plurality of solar blades 4. Located on the first end 29, each of the plurality of first pinions 27 is concentrically positioned on each of the plurality of first shafts 25. One of the plurality of first pinions 27 is driven by the gear and rack assembly 30 and rotates each of the plurality of solar blades 4 through the first shaft 25 and the T-bracket 24 whenever the adjustment of the angle and position of the plurality of solar blades 4 is needed. Further, the second surface 211 of each of the plurality of solar blades 4 is the longitudinal surface opposite the sun-facing surface 21. The second surface 211 can include, but is not limited to, a heat dissipating surface with metal fins, etc. The heat dissipating surface can efficiently and effectively dissipate the heat of the plurality of solar cells 22 to minimize the thermal stress of the solar blades 4.

As can be seen in FIG. 1 to FIG. 8, in the preferred embodiment of the present invention, the gear rack assembly 30 of the solar tracker module 1 comprises a gear rack 31, a plurality of first gears 32, a plurality of second gears 33, a plurality of second pinions 34, a plurality of second shafts 35, a plurality of support boxes 36, and a plurality of support brackets 37. More specifically, the gear rack 31 is positioned adjacent the first end wall 11 of the open frame 3. The plurality of first gears 32 and the plurality of second gears 33 are mounted to the gear rack 21 and distributed across the gear rack in a linear staggering pattern, laterally opposite each other. Additionally, the plurality of first gears 32 and the plurality of second gears 33 can be, but be not limited to, straight linear gears in a rectangular and/or square shape, and any other suitable gears in suitable shapes. Each of the plurality of second pinions 34 is terminally and concentrically connected to each of the plurality of second shafts 35 and engages with a corresponding gear of the plurality of second gears 33 mounted on the gear rack 31. Each of the plurality of second shafts 35 is concentrically connected to each of the plurality of support boxes 36 which is mounted to the back support 14 of the open frame 3 through one of the plurality of support brackets 37. Further, each of the plurality of first gears 32 is engaged with the first pinion 27 of each of the plurality of solar blades 4. In this preferred embodiment, the support boxes 36 provide solid support to the second pinions 34 which do not move but rotate when driven by the motor drive 6 to create linear motion of the gear rack 31. Then this linear motion of the gear rack 31 causes the first gears 32 to rotate but not move, thus creating circular motion of each of the plurality of the solar blades 4.

As can be seen in FIG. 2 to FIG. 5, and FIG. 8, in the preferred embodiment of the present invention, the motor drive 6 of the solar tracker module 1 comprises a motor 41, a drive gear box 42, a drive pinion 43, a drive shaft 44, and a drive box bracket 45. More specifically, the motor 41 is connected to the drive shaft 44 through the drive gear box 42 which is mounted to the back support 14 of the open frame 3 through the drive box bracket 45. The motor 41 used in the present invention can include, but is not limited to a step motor, a variable speed motor, etc. The drive pinion 44 is terminally and concentrically connected to the drive shaft opposite the drive gear box 42, and the drive pinion 44 is engaged with the center gear of the plurality of second gears 33 of the gear and rack assembly 30. The motor 41 is controlled by the method of the present invention. When the motor 41 rotates, the motor 41 causes drive pinion 43 to rotate through the drive gear box 42 which can be designed and configured to achieve a desired speed of the circular motion of each of the plurality of the solar blades 4 connected to the gear rack assembly 30.

Figure 9:
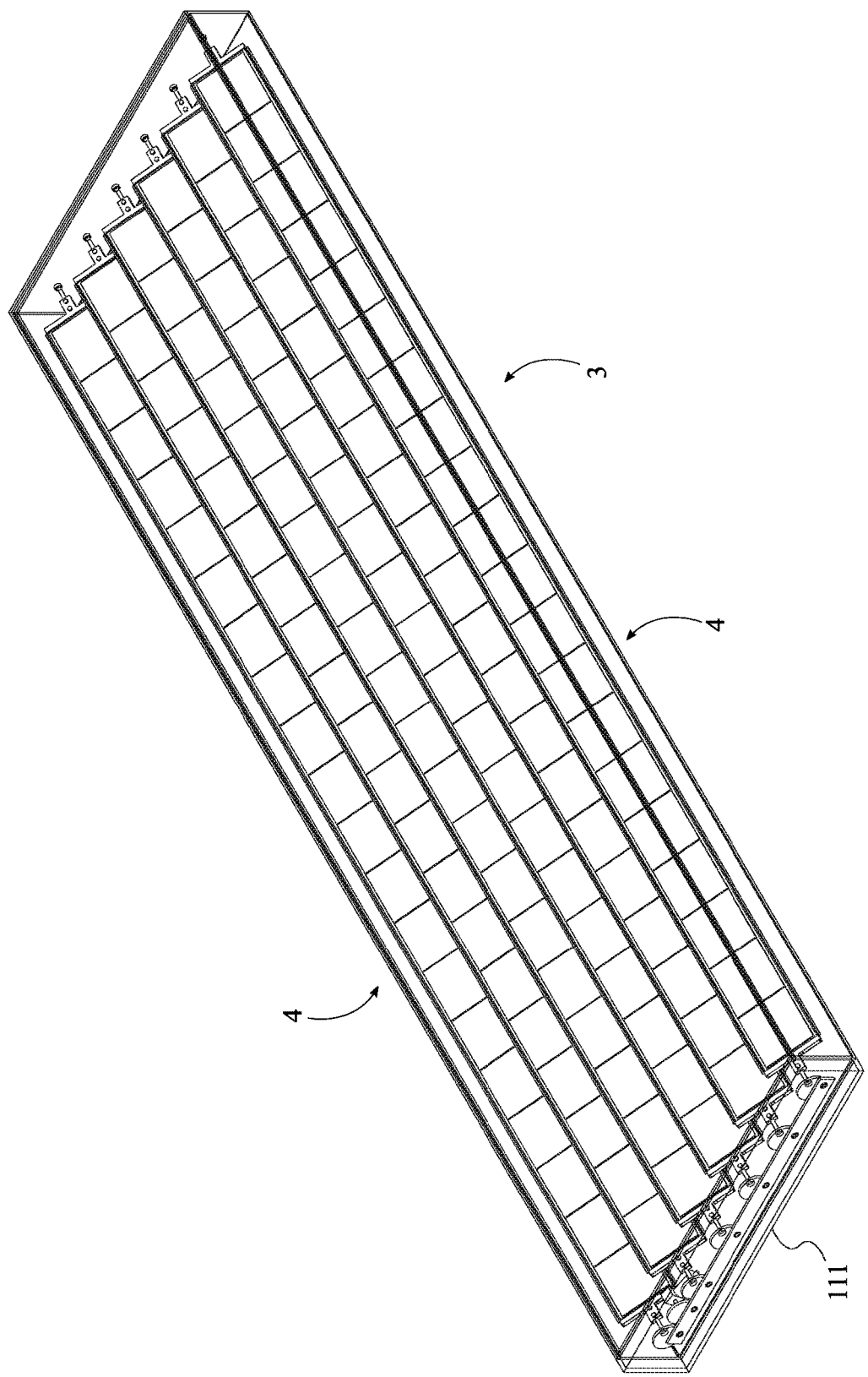
FIG. 9 is an isometric perspective view of an alternative embodiment of the solar tracker module of the present invention.
Figure 10:
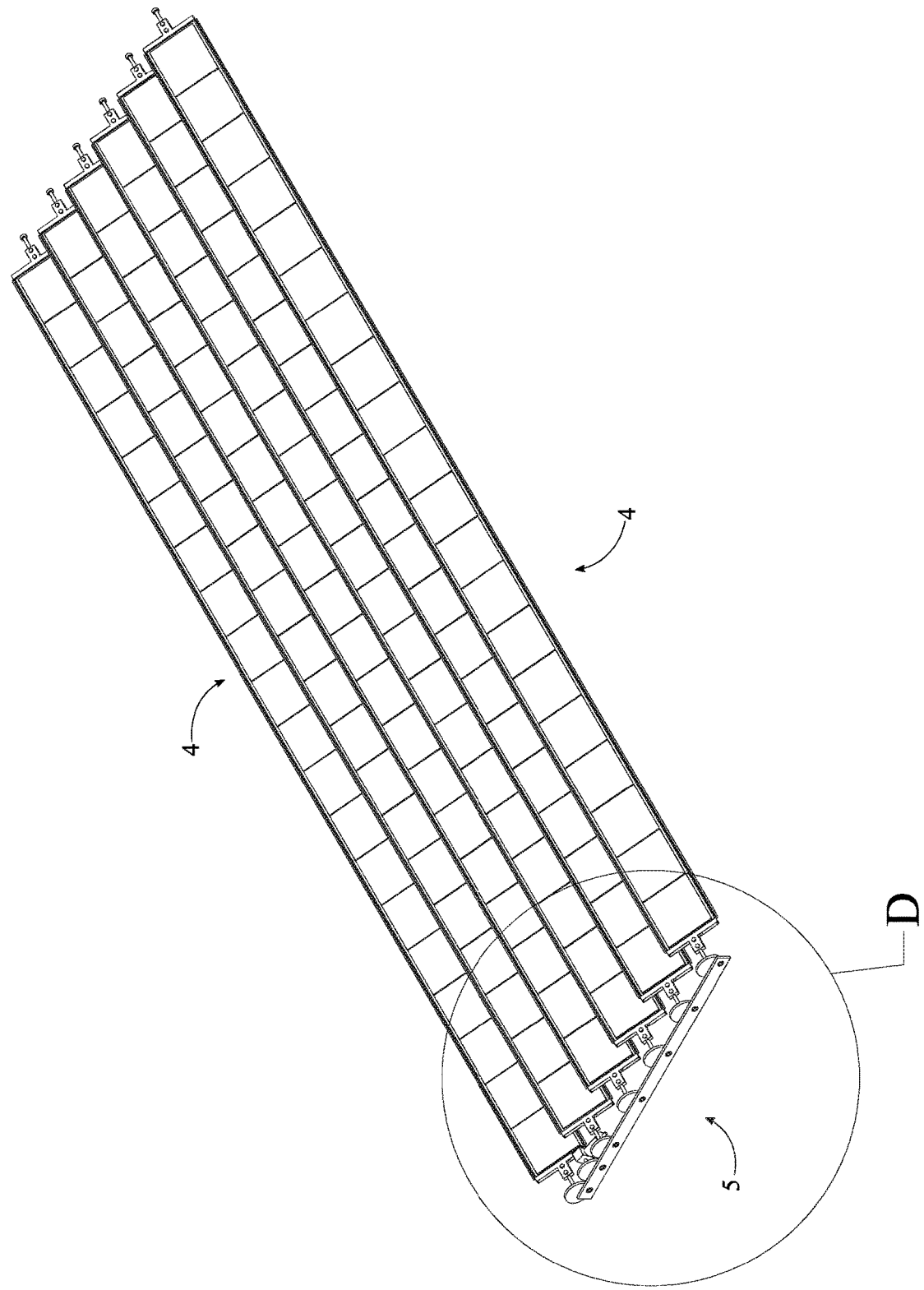
Figure 11:
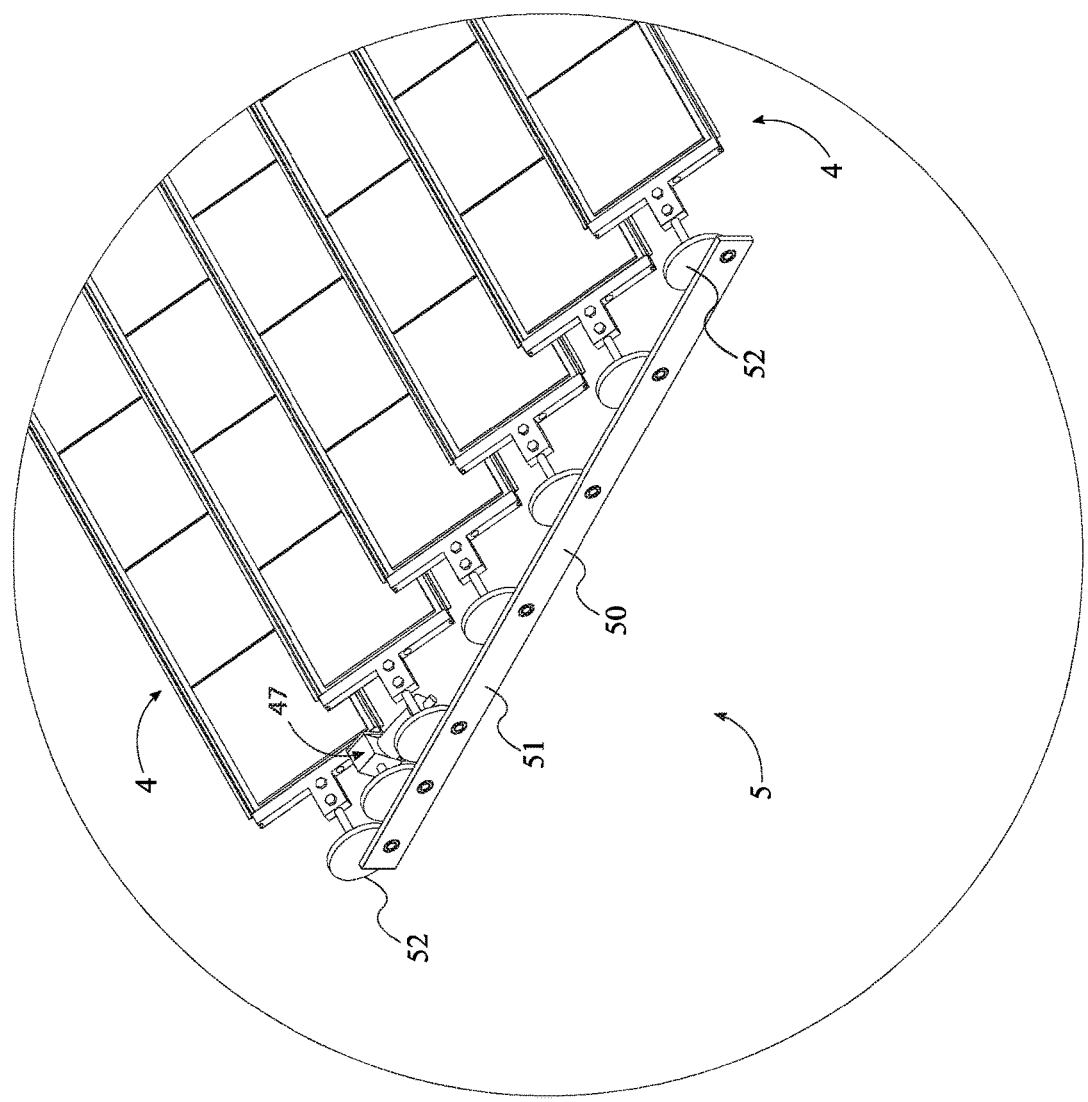
FIG. 11 is a closeup view of section D of the alternative embodiment of the solar tracker module without the exterior frame of the present invention.
Figure 12:
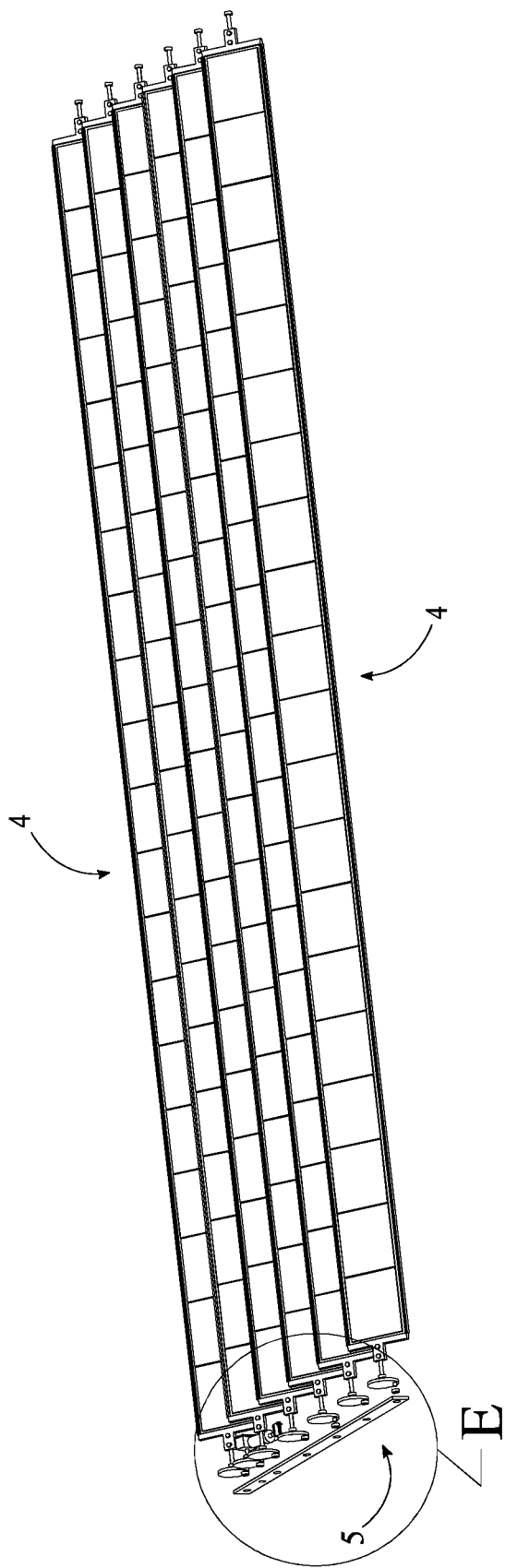
FIG. 12 is a left side exploded view of the alternative embodiment of the solar tracker module without the exterior frame indicating the closeup view of section E of the present invention.
Figure 13:
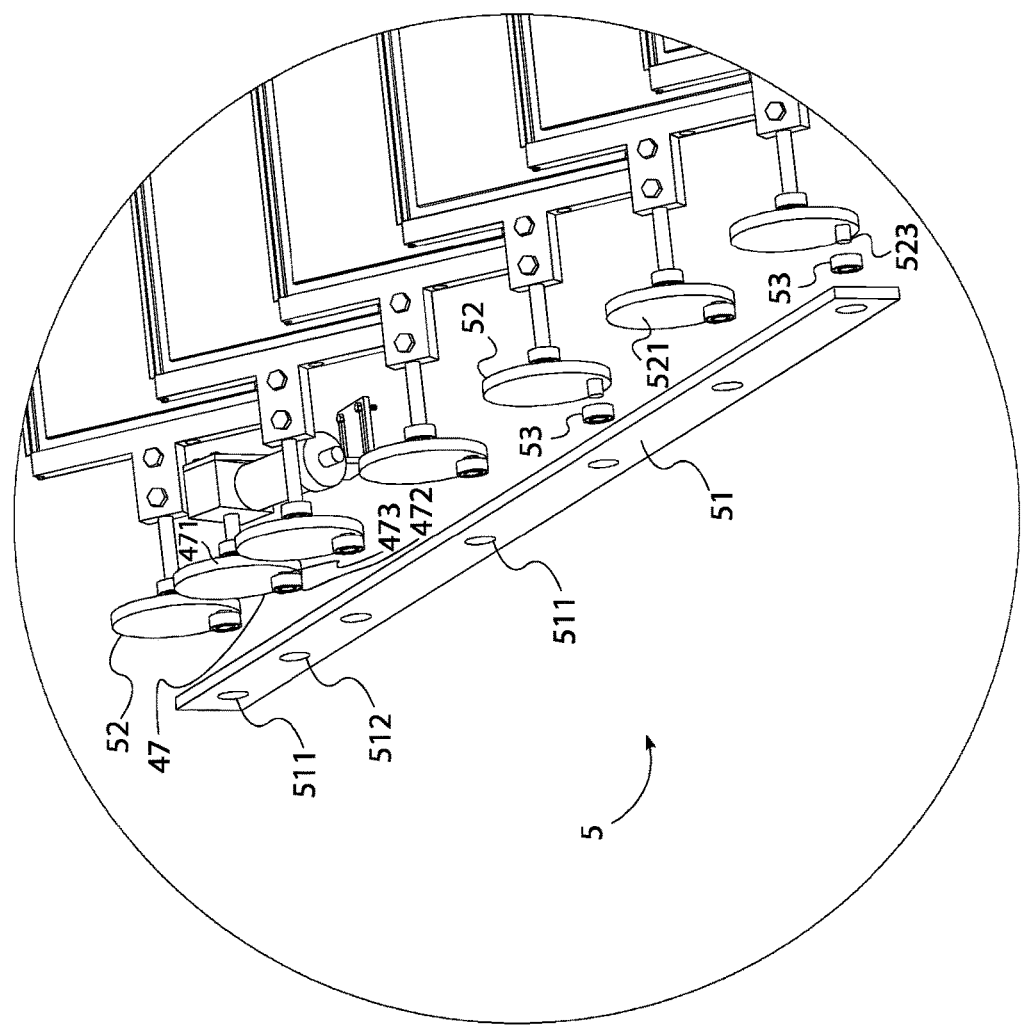
FIG. 13 is a closeup exploded view of section E of the alternative embodiment of the solar tracker module without the exterior frame of the present invention.
Figure 14:
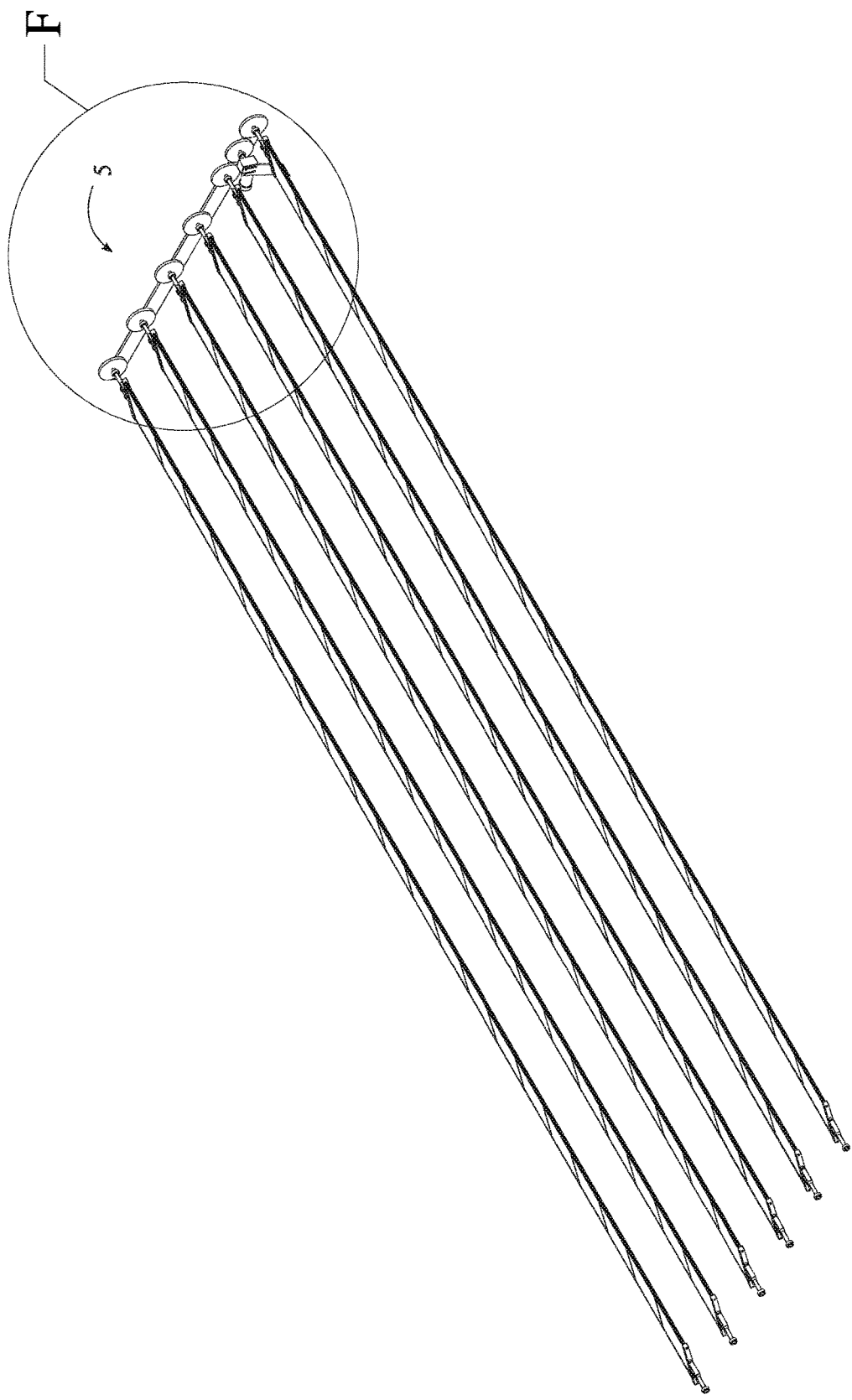
FIG. 14 is a right side view of the alternative embodiment of the solar tracker module without the exterior frame indicating the closeup view of section F of the present invention.
Figure 15:
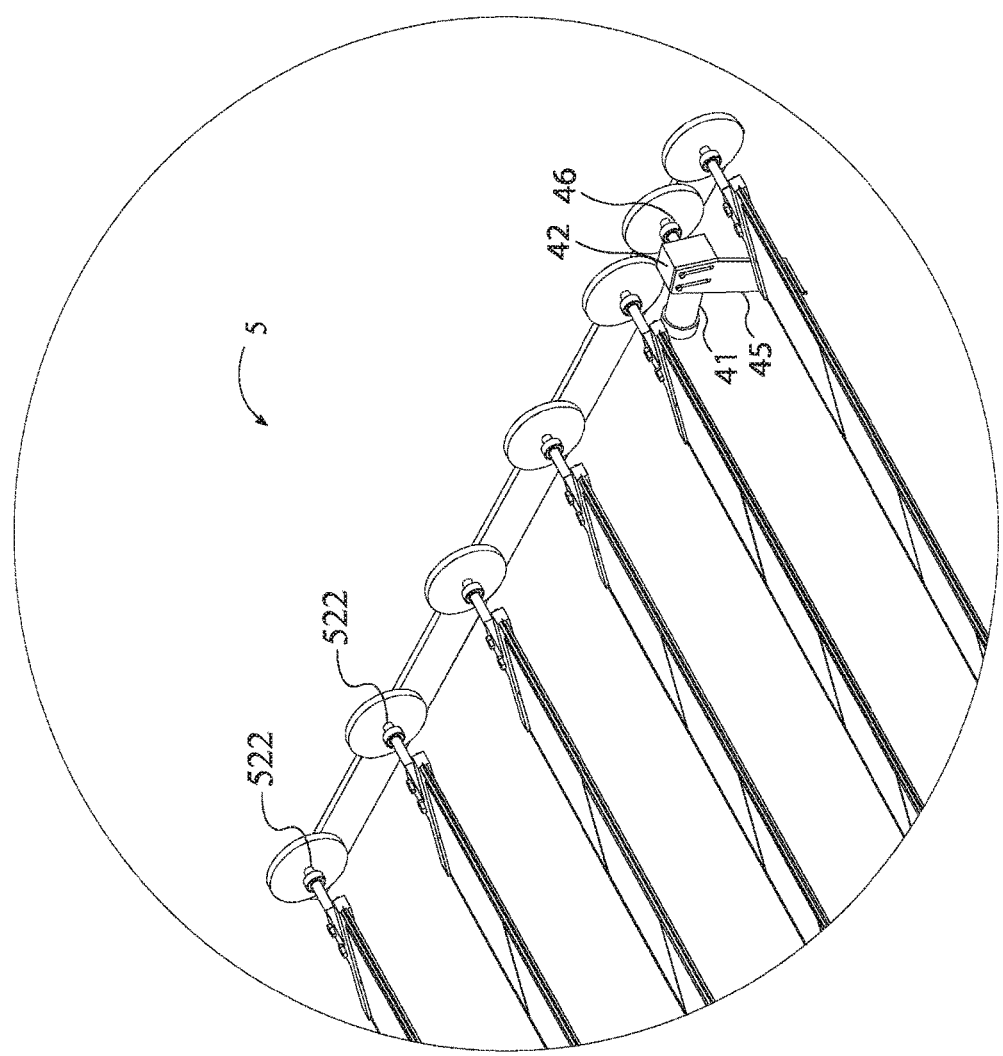
FIG. 15 is a closeup right side view of section F of the alternative embodiment of the solar tracker module without the exterior frame of the present invention.
Figure 16:
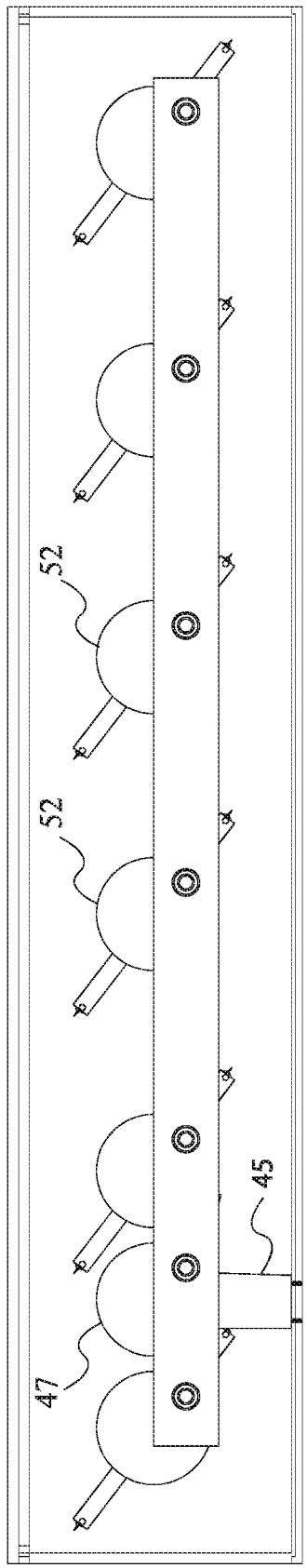
FIG. 16 is a left side view of the alternative embodiment of the solar tracker module of the present invention.
Figure 17:
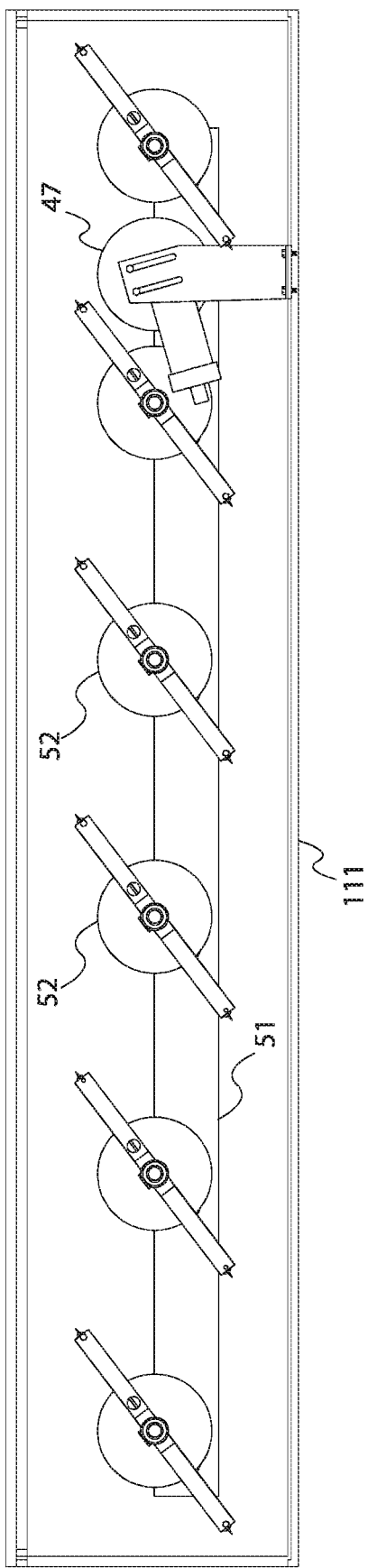
FIG. 17 is a right side view of the alternative embodiment of the solar tracker module of the present invention.
Figure 18:
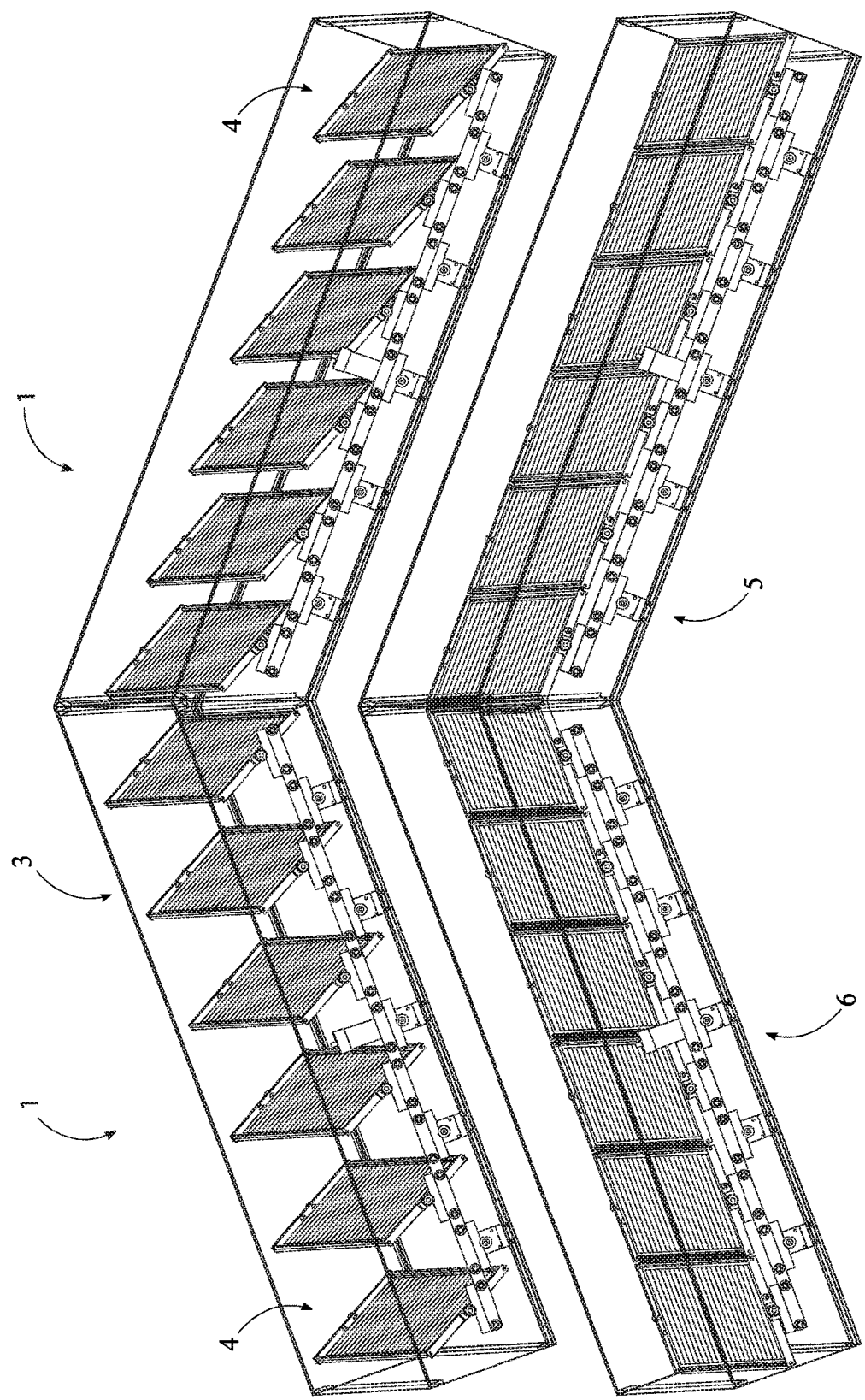
FIG. 18 is an isometric perspective view of a solar tracker system comprising a plurality of solar tracker modules of the present invention.
Figure 19:
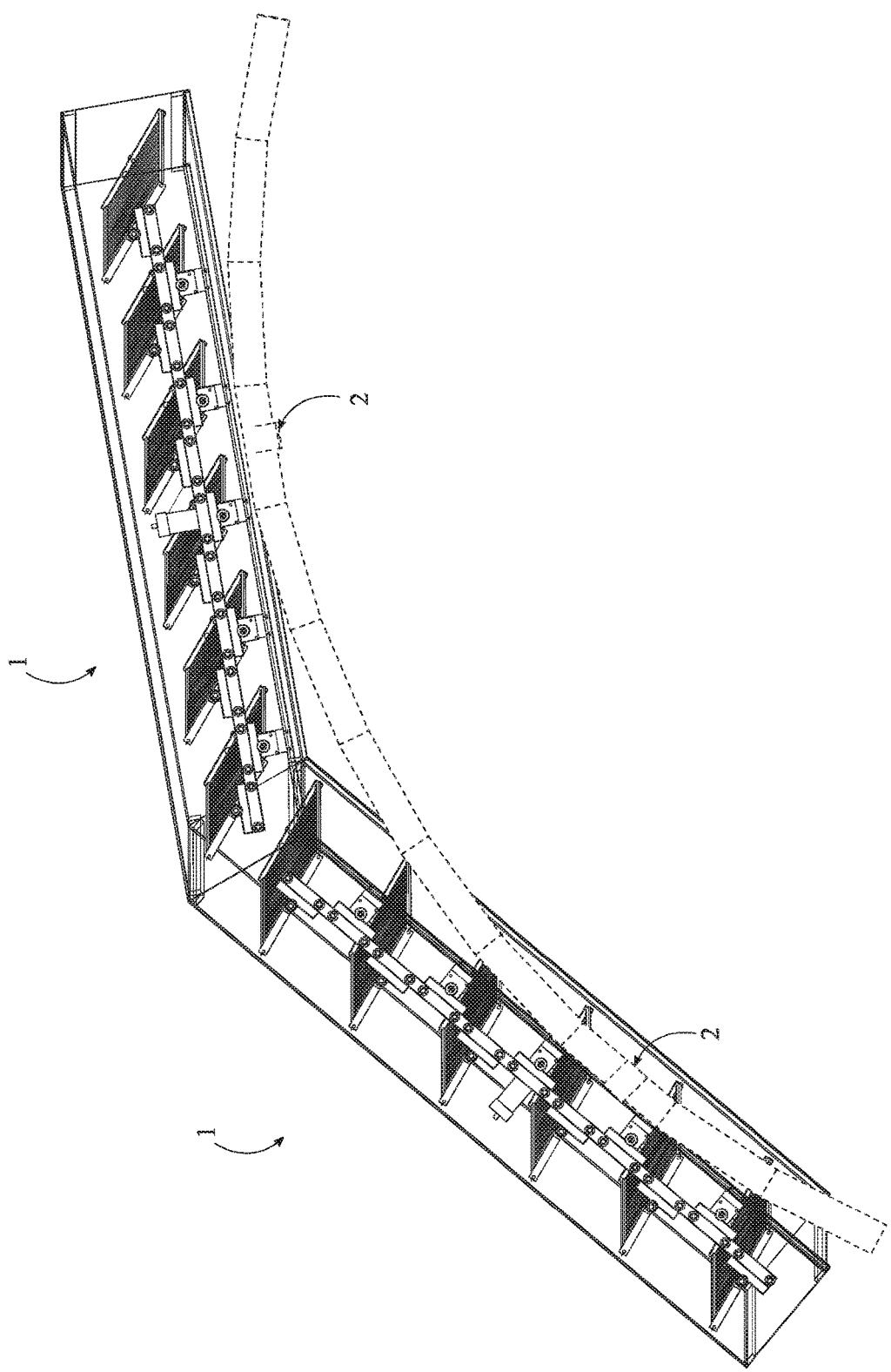
FIG. 19 is an isometric perspective view of a solar tracker system comprising a plurality of solar tracker modules of the present invention being installed on a greenhouse structure member.
Figure 20:
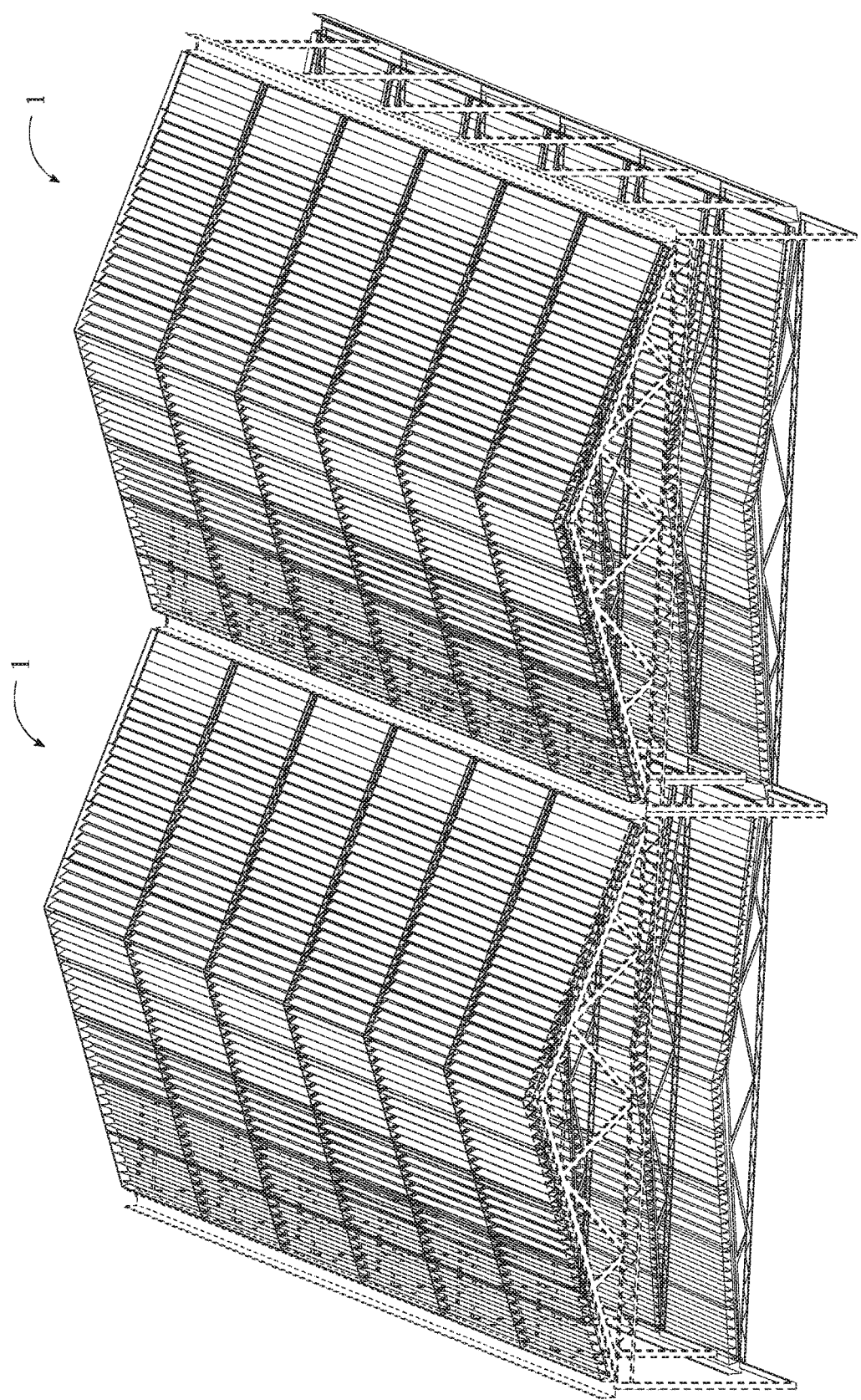
FIG. 20 is an isometric perspective view of a solar tracker system comprising a plurality of solar tracker modules of the present invention being installed on a greenhouse roof.

As can be seen in FIG. 9 to FIG. 17, in an alternative embodiment of the present invention, the rack assembly 5 comprises a flywheel rack assembly 50. More specifically, the flywheel rack assembly 50 driven by the motor drive 6 causes each of the plurality of solar blades 4 to rotate to adjust angles to the sunlight. The open frame 3 comprises an end enclosure 111. The end enclosure 111 is terminally connected to the first end wall and provides protection of the flywheel rack assembly 50 and the motor drive 6 as seen in FIG. 9. Additionally, the end enclosure 111 can be detachable for easy access of the flywheel rack assembly 50 and the motor drive 6 in case of maintenance and repair work. The end enclosure 111 can be made of a material including, but not limited to, rigid and transparent plastic, glazing, etc. Each of the solar blades 4 comprises a plurality of frame bearings 28 as seen in FIG. 13 and FIG. 15. More specifically, for each of the solar blades 4, the frame bearing 28 is concentrically connected to the first shaft 25 adjacent the T-bracket 24 and is engaged with one of the plurality of holes 13 of the first end wall 11 of the open frame 3, thus providing solid support to the first end 29 of each of the plurality of solar blades 4. The motor drive 6 comprises a drive support bearing 46 and drive flywheel 47 as seen in FIG. 13 to FIG. 17. More specifically, the drive support bearing 46 is concentrically connected to the drive shaft 44 adjacent to the drive flywheel 47 and is engaged with the corresponding hole of the plurality holes 13 of the first end wall 11 of the open frame 3, thus providing solid support to the drive motor 6 and the drive shaft 44. The drive flywheel 47 is terminally and concentrically connected to the drive shaft 44 and positioned within the end enclosure 111. Additionally, the drive flywheel 47 comprises a drive flywheel body 471, a drive flywheel bearing 472, and a drive flywheel edge axle 473. The drive flywheel edge axle 473 is positioned on the edge of the drive flywheel body 471. The drive flywheel bearing 472 is terminally and concentrically connected to the flywheel edge axle 473, opposite the drive shaft 44.

As can be seen in FIG. 9 to FIG. 17, the flywheel rack assembly 50 comprises a flywheel rack 51, a plurality of flywheel 52, and a plurality of rack bearings 53. More specifically, the flywheel rack 51 comprises a plurality of holes 511 and a drive hole 512. The plurality of holes 511 is distributed across the flywheel rack 51, which can include, but is not limited to, a rigid elongated bar, or rod, etc. The drive hole 512 is positioned between two adjacent holes of the plurality of holes 511, adjacent to one end hole of the plurality of the holes 511. Additionally, the drive hole 512, to which the drive flywheel bearing 473 of the drive flywheel 47 of the motor drive 6 is concentrically connected, provides connection of the drive flywheel 47 to the flywheel rack 51. Each of the plurality of flywheel 52 comprises a flywheel body 521, a center hole 522, and an edge axle 523. The edge axle 523 is positioned on the edge of the flywheel body 521, opposite to the center hole 522. Each of the plurality of flywheels 52 is terminally and concentrically connected to the first shaft 25 of the first end 29 of each of the plurality of solar blades 4. Each of the plurality of rack bearings 53 is terminally and concentrically connected to the edge axle 523 of each of the plurality of flywheels 52, opposite the frame bearing 28 of the first end 29. Each of the plurality of rack bearings 53 is concentrically connected to each of the plurality of holes 511 of the flywheel rack 51. Thus, the linear motion of the flywheel rack 51 driven by the motor drive 30 through the drive flywheel 47 causes each of the plurality of solar blades 4 to rotate through the first shaft 25 that is concentrically connected to each of the plurality of flywheels 52. Each of the plurality of solar blades 4 can rotate to a full 360 degrees.

As can be seen in FIG. 21 through FIG. 27, the preferred embodiment of the present invention comprises a system and method for controlling the amount of sunlight and maximizing solar energy production of a greenhouse for a plurality of user accounts. More specifically, the method of the present invention offers a specific user account to connect to at least one solar tracker system installed on a roof and/or wall of the greenhouse, wherein the at least one solar tracker system includes a plurality of solar cells for at least one zone inside the greenhouse. The method prompts the user of the specific user account to enter specific user information such as geographical location of the greenhouse, a plurality of plants the specific user plans to grow in the at least one zone inside the greenhouse. With the specific user account information, the method determines the optimal level of sunlight required for each of the plurality of plants in the at least one zone based on expert databases included in the method. Subsequently, the method controls the amount of sunlight and/or shading for each of the plurality of the plants in the at lease one zone per a predetermined time interval through the adjustment of the lag angle of each of the plurality of the solar cells, wherein the lag angle is the angle between the sun-facing surface of a solar blade/cell and the sunlight rays. Additionally, the method provides the control of sunlight based on the actual measurements of the sunlight and the amount of sunlight for the plurality of plants in the at least one zone. Specifically, the method provides the connection of at least one weather station with the present invention, wherein the at least one weather station comprises at least one sunlight sensor, one temperature sensor, one wind speed sensor, one wind direction sensor, one relative humidity (RH) sensor. Further, the method provides connection between the remote server and at least one light sensor, one temperature sensor, one RH sensor, one carbon dioxide (CO2) senor in the at least one zone inside the greenhouse. Whenever a manual control of sunlight and/or shading for the plurality of plants in the at least one zone inside the greenhouse is desired, the method provides the specific user account with a manual control and adjustment of the lag angle of each of the plurality of the solar cells. Furthermore, the method maximizes the solar production of the at least one solar tracker system by controlling the lag angle of each of the plurality of solar cells to track the sunlight, when the sunlight and/or shading of the plurality of plants in the at least one zone is not required. Additionally, the method is able to determine the optimal lag angle of each of the plurality of solar cells to track the sunlight, when there is an acceptable range of lag angles for the desired amount of sunlight and/or shading for the plurality of plants in the at least one zone is needed. Thus, the method of the present invention can provide the flexible and optimal control of the amount of sunlight and/or shading for the plurality of plants in the at least one zone while maximizing solar energy production of the at least one solar system by controlling and adjusting the lag angle each of the plurality of solar cells.

Figure 21:
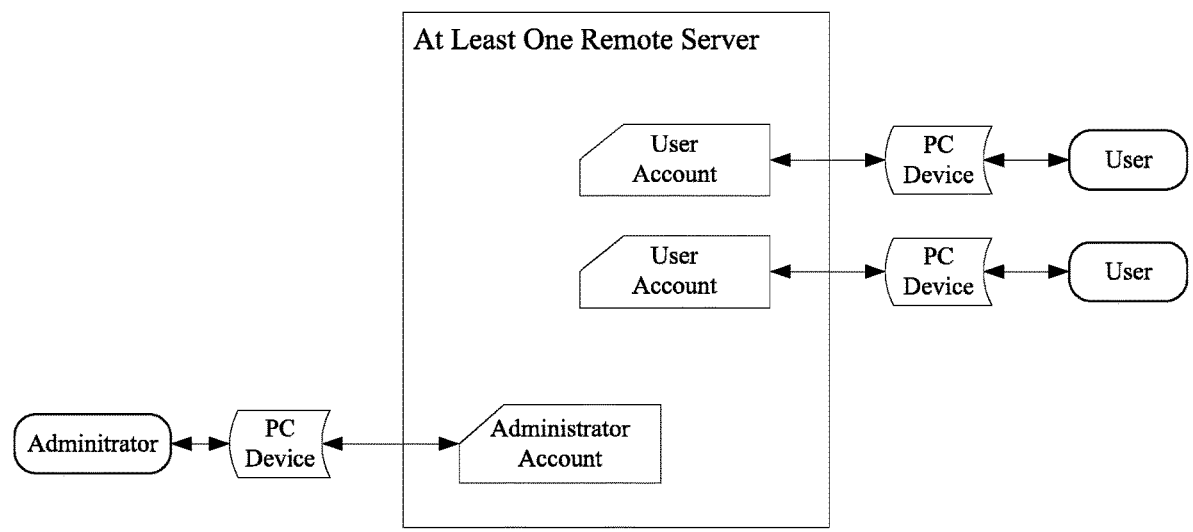
FIG. 21 is a block diagram illustrating the system overview of the present invention.
Figure 22:
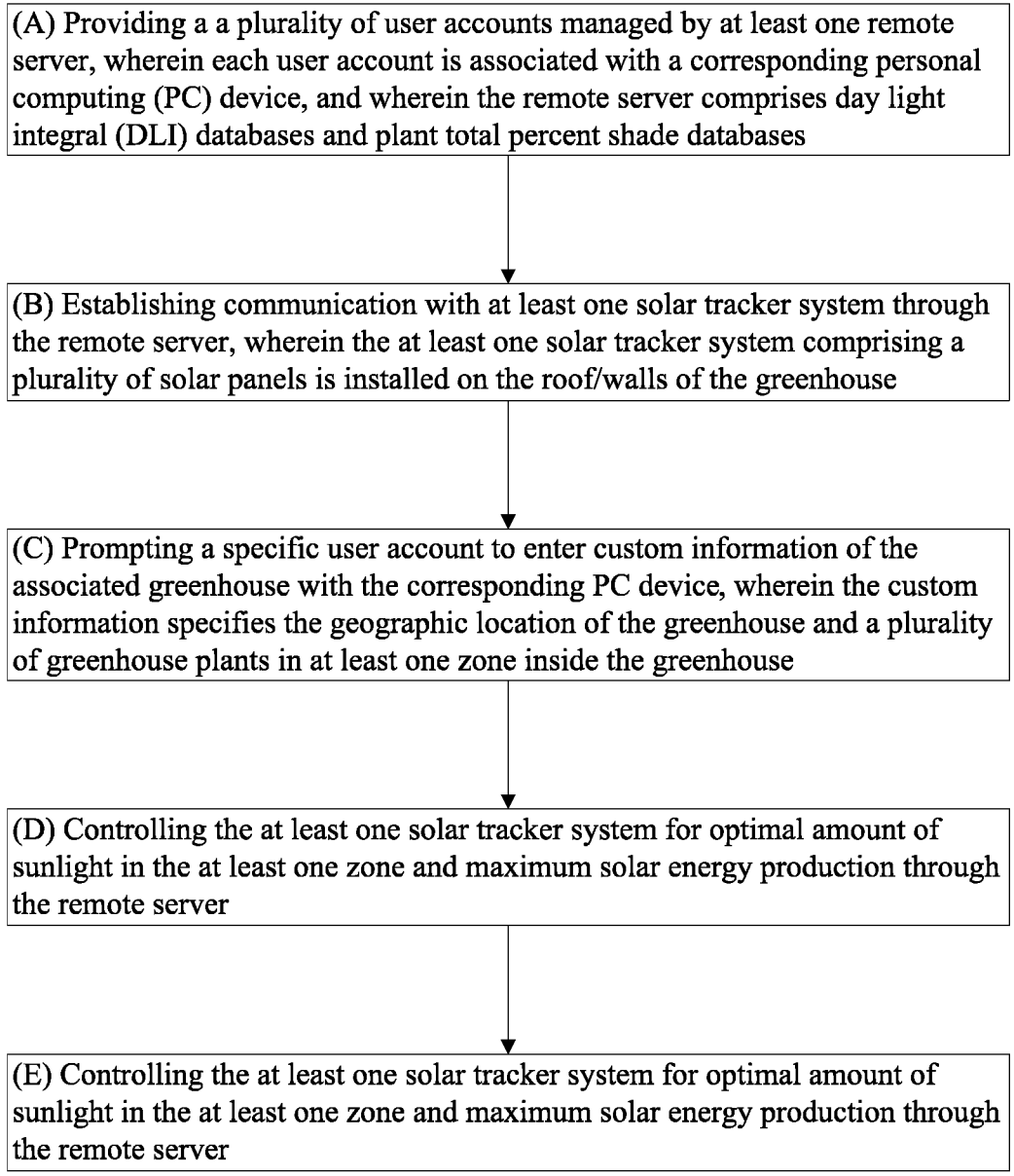
FIG. 22 is a flowchart illustrating the overall process followed by the method of the present invention.

As can be seen in FIG. 21, the method of the present invention provides the plurality of users with optimal control of the amount of sunlight to the plurality of plants in the at least one zone inside the greenhouse and maximum solar energy production of the at least one solar tracker system. To accomplish this, the method of the present invention provides a plurality of user accounts managed by at least one remote server, wherein each user account is associated with a corresponding personal computing (PC) device, and wherein the remote server comprises day light integral (DLI) databases and plant total percent shade databases (Step A) as seen in FIG. 22. Each of the plurality of user accounts is associated with a corresponding user PC device. The corresponding user PC device allows a user to interact with the present invention and can be, but is not limited to, a smartphone, a smart watch, a laptop, a desktop, or a tablet PC. The users of the user accounts may include relevant parties such as, but are not limited to, greenhouse owners, greenhouse operators, managers, contractors, growers, farmers, individuals, consumers, corporations, administrators, etc. Further, the at least one remote server is used to manage the control of sunlight and maximum solar energy production in the greenhouse. The remote server can be managed through an administrator account by an administrator as seen in FIG. 21. Moreover, the remote server is used to execute a number of internal software processes and store data for the present invention. The software processes may include, but are not limited to, server software programs, web-based software applications or browsers embodied as, for example, but not limited to, websites, web applications, desktop applications, and mobile applications compatible with a corresponding user PC device. Additionally, the software processes may use the data of and store data into internal databases and communicate with external databases, which may include but are not limited to map databases (such as Google Maps®), greenhouse databases, agricultural databases, crop databases, plant databases, vegetable databases, fruit databases, produce databases, plant DLI databases, databases of total percent shade for plants in various geographical locations, weather databases, databases maintaining data about solar panel systems, databases maintaining data about solar tracker systems, measurement instrument databases, etc. The interaction with external databases over a communication network may include, but is not limited to, the Internet.

As can be seen in FIG. 22, the overall process of the method used to execute the control of the amount of sunlight and maximum solar energy production in the greenhouse of the present invention starts with establishing the communication with at least one solar tracker system through the remote server, wherein the at least one solar tracker system comprising a plurality of solar cells is installed on the roof/walls of the greenhouse (Step B). More specifically, the at least one solar tracker system can be mounted to structural elements including, but not limited to, roofs, walls, etc. Each of the plurality of solar cells of the solar tracker system can comprise a wired and/or wireless control unit that can adjust the lag angle of each of the plurality of solar cells. The lag angle of a solar panel is zero when the sun-facing solar cell is positioned parallel with the sunlight rays, and 90 degrees when perpendicular to the sunlight rays. By adjusting the lag angle of each of the plurality of solar cells with respect to the sunlight rays, the method can achieve the desired sunlight and/or shading for the plurality of plants in the at lease one zone inside the greenhouse. The wired and/or wireless control unit of each of the plurality of solar cells includes, but is not limited to, a microcontroller, or any other suitable controller. Further, the method can acquire information of the wired and/or wireless control unit of each of the plurality of solar cells, any information of each of the plurality of solar cells, information regarding the solar tracker system, information regarding the greenhouse, etc. Further, the method can acquire such information from the specific user with the corresponding PC device.

Once the method establishes the communication with at least one solar tracker system installed on the greenhouse for the sunlight control of the plurality of plants in at least one zone, the method prompts a specific user account to enter custom information of the associated greenhouse with corresponding PC device, wherein the custom information specifies the geographic location of the greenhouse and a plurality of greenhouse plants in at least one zone inside the greenhouse (Step C). Specifically, in Step C, the method acquires system information entered by the specific user account. Information required includes, but is not limited to, geographic location of the greenhouse, detailed information of the greenhouse such as orientation, floor plan, dimensions, construction, roofs, windows, doors, air-conditioning, lighting, etc., detailed information of the at least one zone such as length, width, height, construction, walls, roofs, windows, doors, lighting, air-conditioning, etc., detailed information of each of the plurality of plants that the specific user plans to grow, the location of the at least one zone where the plurality of plants is to grow, any artificial lighting equipment and schedule for the at least one zone, etc.

With the above custom information, the method subsequently determines the sunlight/shading requirements based on the greenhouse location from optimal DLI for each of the plurality of greenhouse plants in the at least one zone inside the greenhouse through the remote server (Step D). Specifically, the method can use location-specific DLI data from the plant DLI databases and total percent shade data from the plant total percent shade databases for each of the plurality of greenhouse plants to control the solar tracker system. These data cover required DLI and total percent shade values for a full year in a predetermined time interval or schedule for each of the plurality of plants in the at least one zone. Such predetermined time interval or schedule includes, but is not limited to, an hour, 30 minutes, custom time schedule, etc. Additionally, the method provides such control based on the historical sunlight data from the weather databases for the specific user's greenhouse. Further, the control algorithm calculates the resulting adjustment of the lag angle of each of the plurality of the solar cells needed to achieve the required sunlight and/or shading for the plurality of plants in the at least one zone, while maximizing the solar energy production.

Subsequently, the method controls the at least one solar tracker system for optimal amount of sunlight in the at least one zone and maximum solar energy production through the remote server (Step E). More specifically, the method makes necessary adjustments of the lag angle of each of the plurality of the solar cells through the communication with the wired and/or wireless control unit of the each of the plurality of the solar cells.

Figure 23:
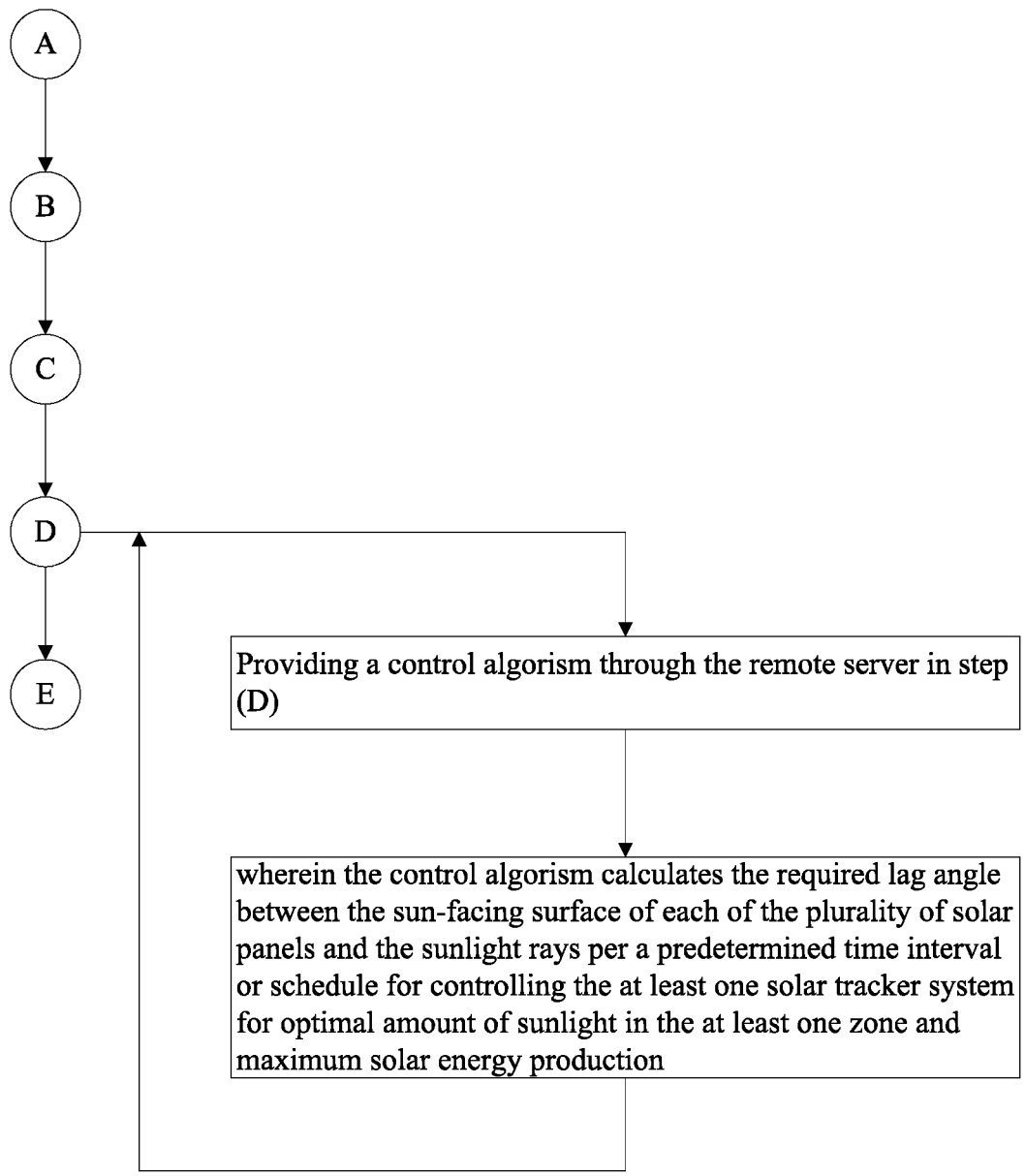
FIG. 23 is a flowchart illustrating a sub-process for providing a control algorithm to calculate the required lag angle of each of a plurality of solar blades of the present invention.

As can be seen in FIG. 23, the method of the present invention comprises a sub-process that provides a control algorithm to calculate the required lag angle of each of the plurality of the solar cells. More specifically, the sub-process of the method provides the control algorithm through the remote server in Step D, wherein the control algorithm calculates the required lag angle between the sun-facing surface of each of the plurality of the solar cells and the sunlight rays per a predefined time interval or schedule for controlling the at least one solar tracker system for optimal amount of sunlight in the at least one zone and maximum solar energy production. The predefined time interval or schedule can include, but is not limited to, an hour, 30 minutes, custom time schedule, etc. Further, the control algorithm of the method calculates the required lag angle of each of the plurality of solar cells based on expert data and/or the correlation between the lag angle and the resulting shade percentage on the corresponding floor area of the greenhouse. Specifically, the shade percentage is the sine of the lag angle plus the percent shading of the total thickness of the plurality of solar cells in the at least one zone inside the greenhouse. The correlation data based on this relationship and other expert data are stored in the database of the present invention. Further, the correlation data include, but are not limited to the exemplary data listed in TABLE I below.

TABLE I

| Lag Angle (°) | Shade Percentage (%) |
|---|---|
| 0 | 3 |
| 5 | 9 |
| 15 | 26 |
| 25 | 42 |
| 30 | 50 |
| 35 | 57 |
| 40 | 64 |
| 50 | 77 |
| 60 | 87 |
| 70 | 94 |

Figure 24:
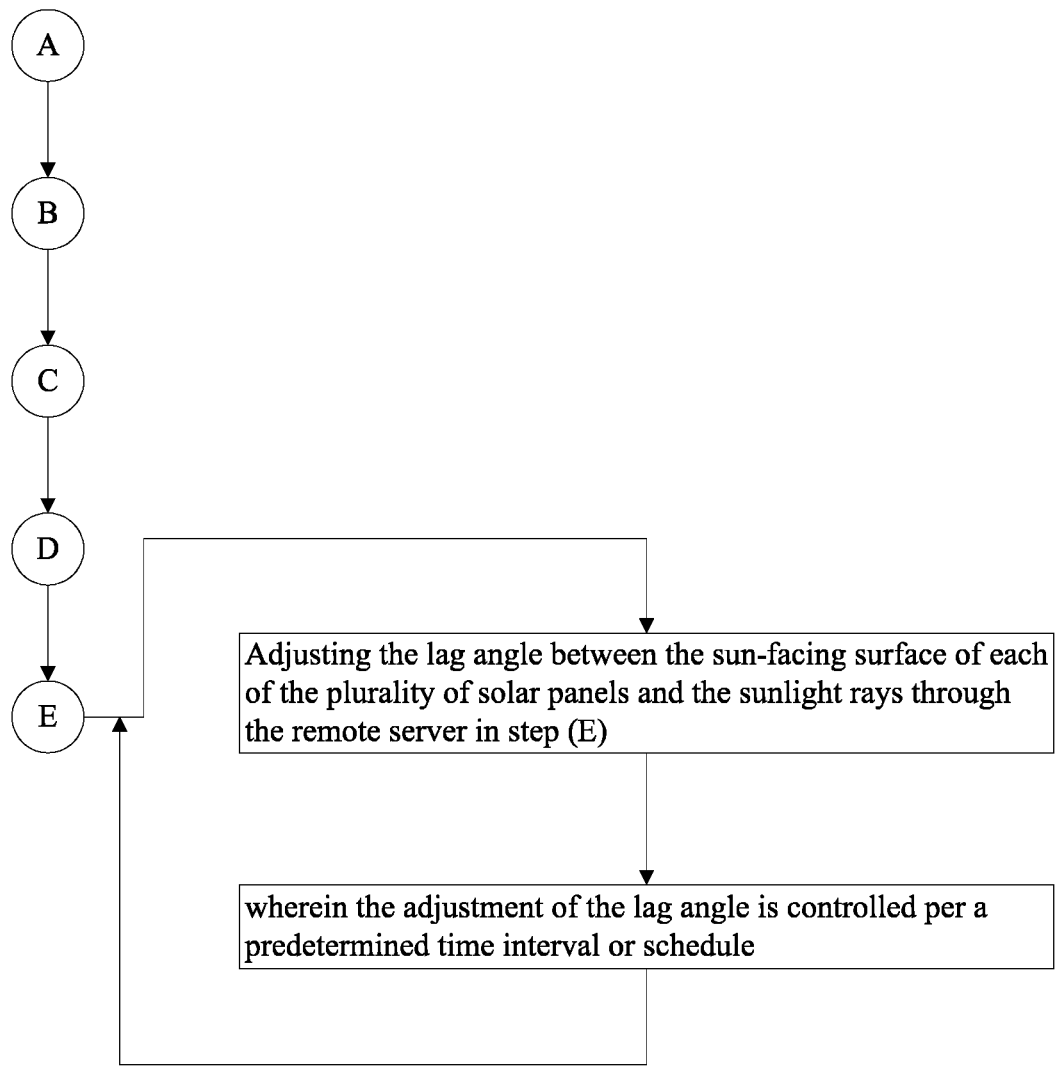
FIG. 24 is a flowchart illustrating a sub-process for adjusting the lag angle of each of the plurality of solar blades of the present invention.

As can be seen in FIG. 24, the method of the present invention comprises a sub-process to adjust the lag angle of each of the plurality of the solar cells. More specifically, the sub-process of the method adjusts the lag angle between the sun-facing surface of each of the plurality of the solar cells and the sunlight rays through the remote server in Step E, wherein the adjustment of the lag angle is controlled per a predetermined time interval or schedule. Further, the method offers the adjustment of the lag angle to be conducted by the specific user with a manual control on the corresponding PC device.

Figure 25:
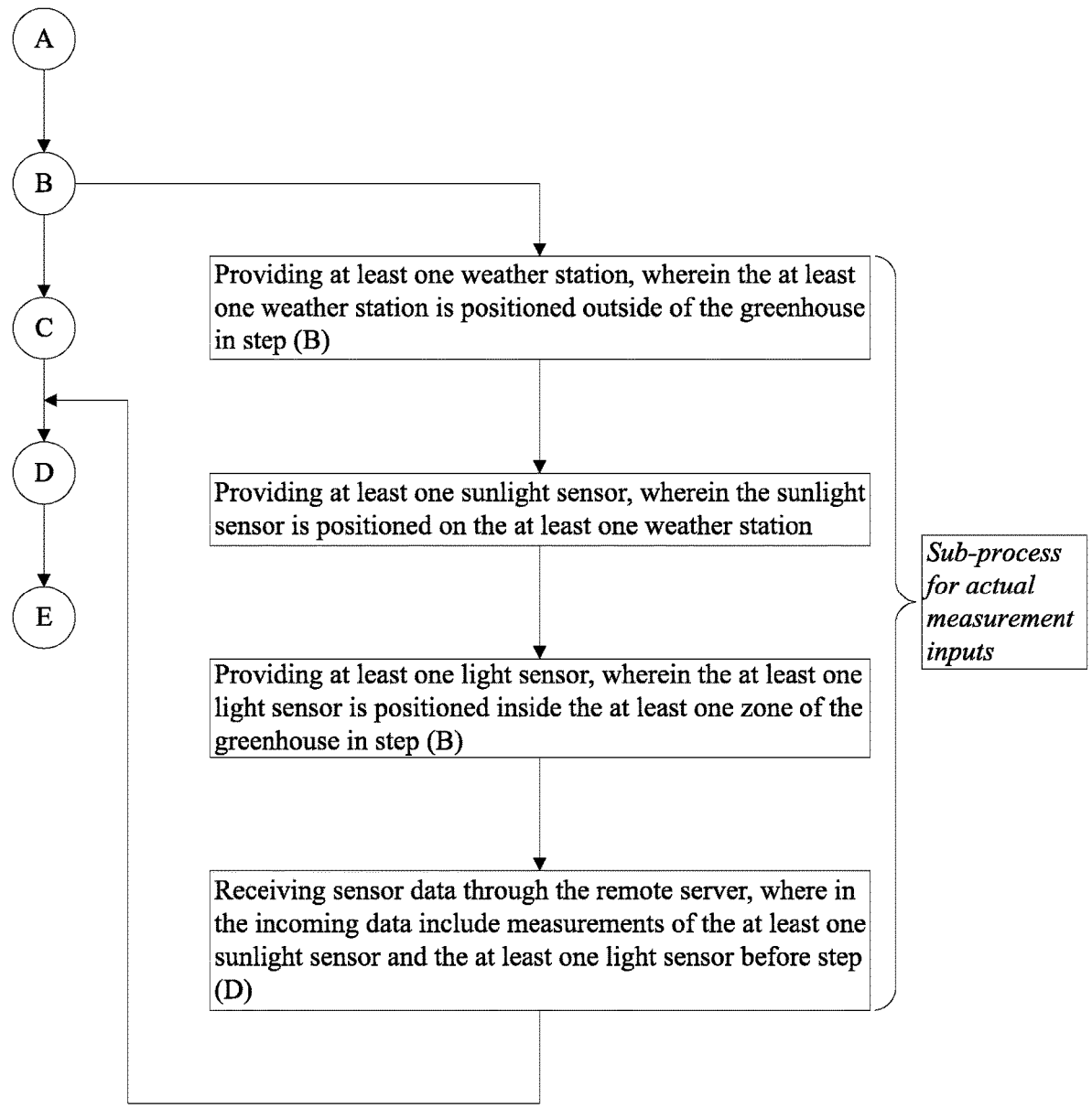
FIG. 25 is a flowchart illustrating a sub-process for accepting actual measurement inputs of the present invention.
Figure 26:
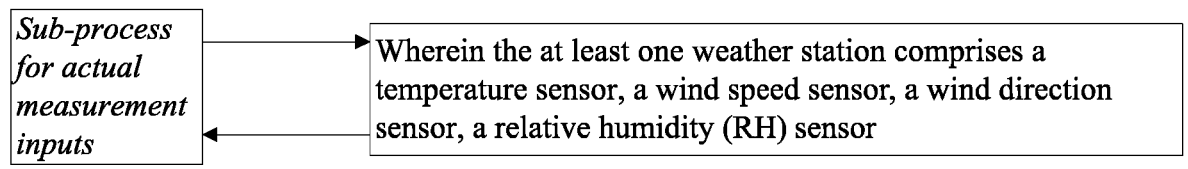
FIG. 26 is a flowchart illustrating a sub-process for accepting other actual measurement inputs from a weather station of the present invention
Figure 27:
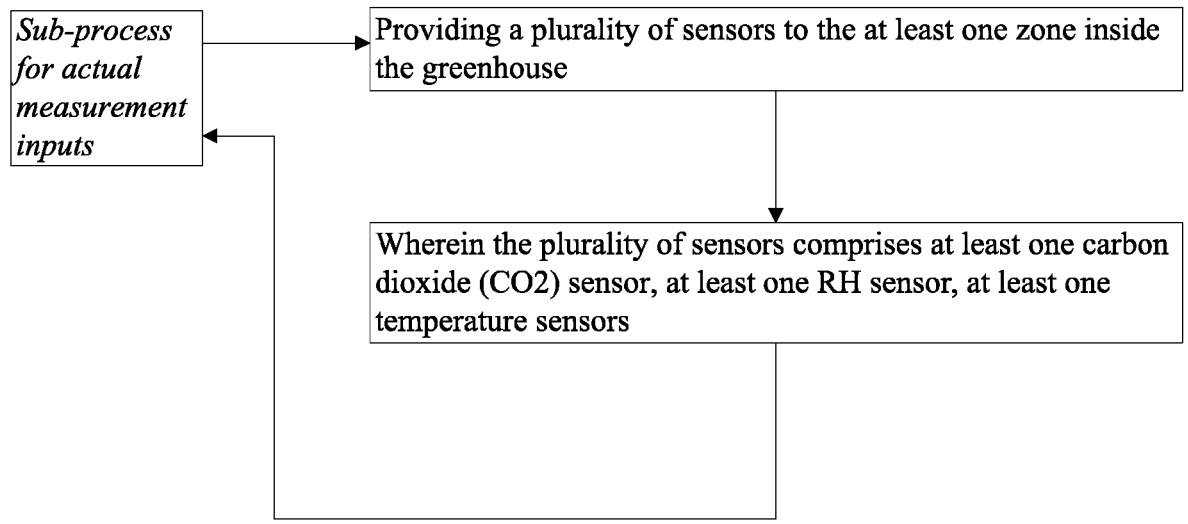
FIG. 27 is a flowchart illustrating a sub-process for accepting other actual measurement inputs from inside the greenhouse of the present invention

As can be seen in FIG. 25, the method of the present invention comprises a sub-process to accept actual measurements as inputs. More specifically, the sub-process of the method provides at least one weather station, wherein the at least one weather station is positioned outside of the greenhouse in Step B. The method provides at least one sunlight sensor, wherein the sunlight sensor is positioned on the at least one weather station. Additionally, the method provides at least one light sensor, wherein the least one light sensor is positioned inside the at least one zone of the greenhouse in Step B. Further, the method receives sensor data through the remote server, wherein the incoming data include measurements of the at least one sunlight sensor and the at least one light sensor before Step D. These measurement data are used in Step D for the determination of the sunlight/shading requirements for the plurality of plants in the at least one zone inside the greenhouse for the optimal sunlight control and the solar energy production. In other embodiments of the present invention, as seen in FIG. 26, this sub-process can include other sensors for the weather station and inside of the at least one zone, such as, but be not limited to, temperature sensors, wind speed sensors, wind direction sensors, RH sensors for the at least one weather station. Further, as seen in FIG. 27, the method can provide at least one sensor of the following sensors including, but not limited to, $CO_2$ sensors, RH sensors, temperature sensors, etc. The measurements of these sensors are used in Step D for the determination of the sunlight/shading requirements for the plurality of plants in the at least one zone inside the greenhouse for the optimal sunlight control and the solar energy production.

Although the invention has been explained in relation to its preferred embodiment, it is to be understood that many other possible modifications and variations can be made without departing from the spirit and scope of the invention as hereinafter claimed.

What is claimed is:

1. A solar tracker system for controlling the amount of sunlight and maximizing solar energy in a greenhouse comprising:
   an open frame;
   a plurality of solar blades
   a rack assembly;
   a motor drive;
   the open frame comprising a first end wall, a second end wall, and a back support;
      the first end wall being terminally positioned on the back support;
      the second end wall being terminally positioned on the back support, opposite the first end wall; wherein each of the first end wall and second end wall of the open frame comprising a plurality of holes;
   each of the plurality of solar blades comprising a sun-facing surface, a plurality of solar panels, a first end, and a second end;
      the plurality of solar panels being exteriorly mounted on the sun-facing surface;
      the first end being distally positioned on one of the plurality of solar blades;
      the first end of each of the plurality of solar blades being rotationally mounted to the first end wall of the open frame;
      the second end being distally positioned on one of the plurality of solar blades, opposite the first end;
      the second end of each of the plurality of solar blades being rotationally mounted to the second end wall of the open frame;
   wherein each of the first end and second end of the plurality of solar blades comprising a T-bracket, a first shaft, and an end bearing;
      the T-bracket being terminally connected to each of the first end and second end;
      the first shaft is terminally and centrally connected to the T-bracket;
      the end bearing being terminally and concentrically connected to the first shaft, opposite the T-bracket; and
      the end bearing being mounted to one of the plurality of holes of each of the first end wall and second end wall of the open frame;
      the first end of each of the plurality of solar blades comprising a first pinion;
      the first pinion is concentrically positioned on the first shaft of the first end, between the T-bracket and end bearing;
   the rack assembly being mounted to each of the plurality of solar blades, adjacent the second end;
   wherein the rack assembly comprising a gear rack assembly;
   the gear rack assembly comprising a gear rack, a plurality of first gears, a plurality of second gears, a plurality of second pinions, a plurality of second shafts, a plurality of support boxes, and a plurality of support brackets;
      the plurality of first gears and the plurality of second gears being distributed across the gear rack in a linear staggering manner and laterally opposite each other;
      each of the plurality of second pinions being terminally and concentrically connected to each of the plurality of second shafts;
      each of the plurality of second pinions being engaged with a corresponding gear of the plurality of second gears;
      each of the plurality of second shafts being concentrically connected to each of the plurality of support boxes;
      each of the plurality of support boxes being mounted to the back support of the open frame through one of the plurality of support brackets;
      each of the plurality of first gears of the gear rack assembly being engaged with the first pinon of each of the plurality of solar blades;
   the motor drive comprising a motor;
   the motor being mounted to the back support of the open frame, adjacent the second end wall;
   the motor being connected to rack assembly;
   wherein the motor drive comprising a drive gear box, a drive pinion, a drive shaft, a drive box bracket;
   the motor being connected to the drive shaft through the drive gear box;
   the drive gear box being mounted to the back support of the open frame through the drive box bracket, adjacent the first end wall;
   the drive pinion being terminally and concentrically connected to the drive shaft opposite the drive gear box; and
   the drive pinion being engaged with the center gear of the plurality of second gears of the gear and rack assembly.

2. The solar tracker system for controlling the amount of sunlight and maximizing solar energy in a greenhouse as claimed in claim 1 comprising:
   each of the plurality of solar blades comprising a second surface;
   the second surface being positioned opposite the sun-facing surface; and
   the second surface being a diffuse surface.

3. The solar tracker system for controlling the amount of sunlight and maximizing solar energy in a greenhouse as claimed in claim 2, wherein the second surface comprises heat dissipation fins.

* * * * *